US012713444B2

(12) United States Patent
Zhang et al.

(10) Patent No.: US 12,713,444 B2
(45) Date of Patent: Aug. 18, 2026

(54) WIRELESS COMMUNICATION METHODS, TERMINAL DEVICES, AND NETWORK DEVICE

(71) Applicant: GUANGDONG OPPO MOBILE TELECOMMUNICATIONS CORP., LTD., Dongguan (CN)

(72) Inventors: Yi Zhang, Dongguan (CN); Yanan Lin, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 383 days.

(21) Appl. No.: 18/506,820

(22) Filed: Nov. 10, 2023

(65) Prior Publication Data

US 2024/0080860 A1 Mar. 7, 2024

Related U.S. Application Data

(63) Continuation of application No. PCT/CN2021/092844, filed on May 10, 2021.

(51) Int. Cl.
*H04W 72/232* (2023.01)
*H04L 1/1812* (2023.01)
(Continued)

(52) U.S. Cl.
CPC ......... *H04W 72/232* (2023.01); *H04L 1/1812* (2013.01); *H04L 1/1861* (2013.01); *H04W 72/11* (2023.01)

(58) Field of Classification Search
CPC ... H04W 72/232; H04W 72/11; H04L 1/1812; H04L 1/1861
See application file for complete search history.

(56) References Cited

U.S. PATENT DOCUMENTS

2021/0084622 A1 3/2021 Choi et al.
2022/0014317 A1* 1/2022 Wu ...................... H04L 1/1896
(Continued)

FOREIGN PATENT DOCUMENTS

CN 110149717 A 8/2019
CN 110708146 A 1/2020
(Continued)

OTHER PUBLICATIONS

International Search Report and Written Opinion dated Jan. 24, 2022 in International Application No. PCT/CN2021/092844. English translation attached.

(Continued)

*Primary Examiner* — Won Tae C Kim
(74) *Attorney, Agent, or Firm* — Sheppard, Mullin, Richter & Hampton LLP

(57) ABSTRACT

A wireless communication method, a terminal device, and a network device are provided. At least one DCI is received. A target HARQ-ACK codebook is determined or generated. The target HARQ-ACK codebook corresponds to PDSCH reception scheduled by the at least one DCI, SPS PDSCH release indicated by the at least one DCI or Secondary Cell (SCell) dormancy indicated by the at least one DCI. The at least one DCI includes a first DCI format and/or a second DCI format, the first DCI format being used to schedule one PDSCH, and the second DCI format being used to schedule at least two PDSCHs corresponding to at least one PDSCH group. By introducing the second DCI format, the scheduling of the PDSCH is improved, which improves system performance.

15 Claims, 4 Drawing Sheets

(51) Int. Cl.
*H04L 1/1829* (2023.01)
*H04W 72/11* (2023.01)

(56) References Cited

U.S. PATENT DOCUMENTS

| | | | | |
|---|---|---|---|---|
| 2022/0201726 | A1* | 6/2022 | Papasakellariou | H04W 72/1273 |
| 2022/0303979 | A1* | 9/2022 | Li | H04W 72/21 |
| 2024/0187136 | A1* | 6/2024 | Nishio | H04L 1/08 |

FOREIGN PATENT DOCUMENTS

| | | | |
|---|---|---|---|
| CN | 111742510 | A | 10/2020 |
| CN | 111937316 | A | 11/2020 |
| CN | 111971920 | A | 11/2020 |
| CN | 112398631 | A | 2/2021 |
| WO | 2019158074 | A1 | 8/2019 |
| WO | 2020220359 | A1 | 11/2020 |
| WO | 2021012250 | A1 | 1/2021 |

OTHER PUBLICATIONS

Oppo, "Discussion on multi-cell PDSCH scheduling via a single DCI" 3GPP TSG RAN WG1 #104-e R1-2100187, Jan. 2021.

Extended European Search Report dated May 7, 2024 received in European Patent Application No. EP21941179.0, 14 pages.

MediaTek Inc., "Enhancements to HARQ for NR-U operation," Agenda Item 7.2.2.2.3, R1-1906545, 3GPP TSG RAN WG1 #97, May 13, 2019, 11 pages.

Nokia et al., "HARQ scheduling and feedback for NR-U," Agenda item 7.2.2.2.3, R1-1906644, 3GPP TSG RAN WG1 Ad-Hoc Meeting #97, May 13, 2019, 14 pages.

Intel Corporation, "Enhancements to HARQ for NR-unlicensed," Agenda item 7.2.2.2.3, R1-2001989, 3GPP TSG RAN WG1 Meeting #100bis-e, Aug. 11, 2020, 9 pages.

* cited by examiner

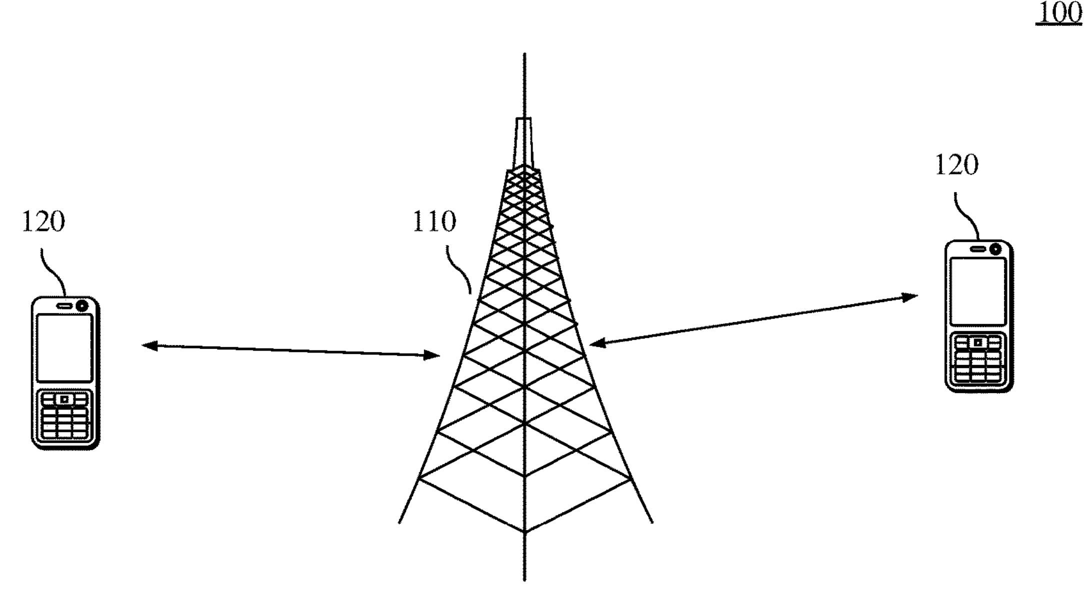

FIG. 1

| | PDCCH Monitoring Occasion 1 | PDCCH Monitoring Occasion 2 | PDCCH Monitoring Occasion 3 | PDCCH Monitoring Occasion 4 | PDCCH Monitoring Occasion 5 | PDCCH Monitoring Occasion 6 |
|---|---|---|---|---|---|---|
| Carrier 1 | (DCI)PDSCH 1 DAI=1 | (DCI)PDSCH 2 DAI=2 | | (DCI)PDSCH 3 DAI=3 | | (DCI)PDSCH 4 DAI=4 |

FIG. 2

| | PDCCH Monitoring Occasion 1 | PDCCH Monitoring Occasion 2 | PDCCH Monitoring Occasion 3 | PDCCH Monitoring Occasion 4 | PDCCH Monitoring Occasion 5 | PDCCH Monitoring Occasion 6 | PDCCH Monitoring Occasion 6 |
|---|---|---|---|---|---|---|---|
| Carrier 1 | (DCI)PDSCH 1 DAI=1 | (DCI)PDSCH 2 DAI=2 | (DCI)PDSCH 3 DAI=3 | (DCI)PDSCH 4 DAI=4 | (DCI)PDSCH 5 DAI=5 | (DCI)PDSCH 6 DAI=6 | (DCI)PDSCH 7 DAI=7 |

FIG. 3

| | PDCCH Monitoring Occasion 1 | PDCCH Monitoring Occasion 2 | PDCCH Monitoring Occasion 3 |
|---|---|---|---|
| Carrier 1 | PDSCH 1 (C-DAI=1,T-DAI=2) | PDSCH 3 (C-DAI=3,T-DAI=4) | PDSCH 5 (C-DAI=1,T-DAI=1) |
| Carrier 2 | PDSCH 2 (C-DAI=2,T-DAI=2) | PDSCH 4 (C-DAI=4,T-DAI=4) | |

FIG. 4

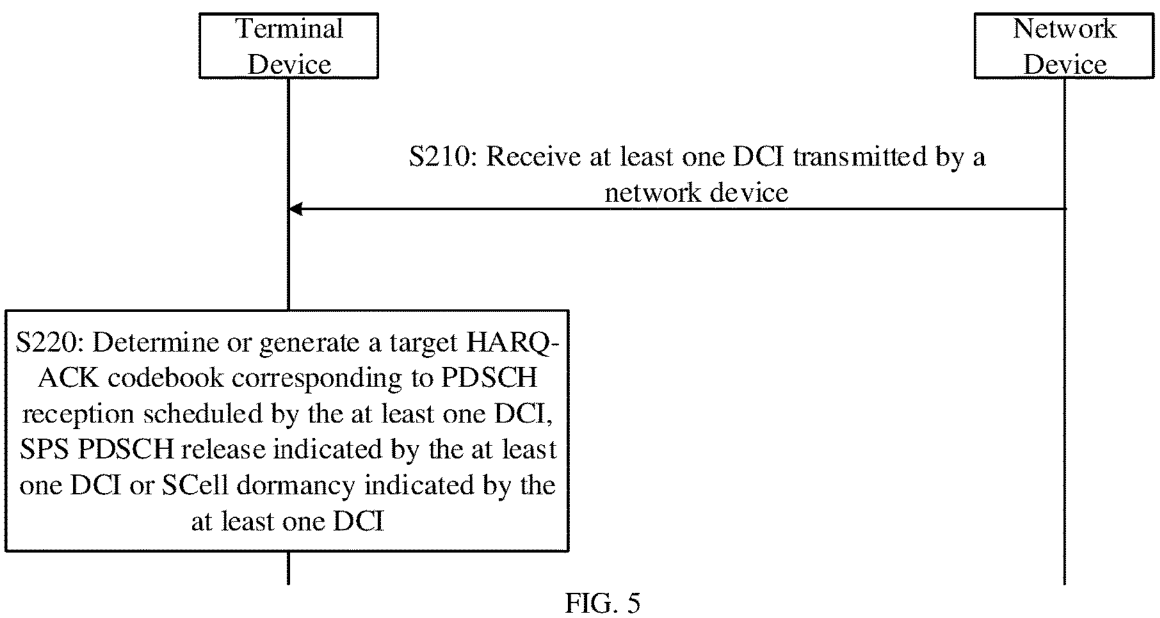

FIG. 5

| Third HARQ-ACK Sub-codebook | Fourth HARQ-ACK Sub-codebook | Fifth HARQ-ACK Sub-codebook | Sixth HARQ-ACK Sub-codebook |
|---|---|---|---|

FIG. 6

| Third HARQ-ACK Sub-codebook | Fifth HARQ-ACK Sub-codebook | Fourth HARQ-ACK Sub-codebook | Sixth HARQ-ACK Sub-codebook |
|---|---|---|---|

FIG. 7

| | PDCCH Monitoring Occasion 1 | PDCCH Monitoring Occasion 2 | PDCCH Monitoring Occasion 3 | PDCCH Monitoring Occasion 4 |
|---|---|---|---|---|
| Carrier 1 (First DCI Format) | PDSCH 1 (First PDSCH Group) : {C-DAI=1, T-DAI=1} | PDSCH 3 (First PDSCH Group) : {C-DAI=2, T-DAI=2} | | PDSCH 6 (First PDSCH Group) : {C-DAI=4, T-DAI=2} |
| Carrier 2 (First DCI Format and Second DCI Format) | PDSCH 2 (Second PDSCH Group) : {C-DAI=1, T-DAI=1} | PDSCH 4 (Second PDSCH Group) : {C-DAI=2, T-DAI=2} | | PDSCH 7 (First PDSCH Group) : {C-DAI=1, T-DAI=2} |
| Carrier 3 (Second DCI Format) | | | PDSCH 5 (First PDSCH Group) : {C-DAI=3, T-DAI=3} | PDSCH 8 (First PDSCH Group) : {C-DAI=2, T-DAI=2} |

FIG. 8

| | PDCCH Monitoring Occasion 1 | PDCCH Monitoring Occasion 2 | PDCCH Monitoring Occasion 3 | PDCCH Monitoring Occasion 4 |
|---|---|---|---|---|
| Carrier 1 (CBG-based Transmission, First DCI Format) | PDSCH 1 (First PDSCH Group): {C-DAI=1, T-DAI=1} | PDSCH 3 (First PDSCH Group): {C-DAI=2, T-DAI=2} | | PDSCH 6 (First PDSCH Group): {C-DAI=4, T-DAI=2} |
| Carrier 2 (TB-based Transmission, First DCI Format and Second DCI Format) | PDSCH 2 (Second PDSCH Group): {C-DAI=1, T-DAI=1} | PDSCH 4 (Second PDSCH Group): {C-DAI=2, T-DAI=2} | | PDSCH 7 (First PDSCH Group): {C-DAI=1, T-DAI=2} |
| Carrier 3 (TB-based Transmission, Second DCI Format) | | | PDSCH 5 (First PDSCH Group): {C-DAI=3, T-DAI=3} | PDSCH 8 (First PDSCH Group): {C-DAI=2, T-DAI=2} |

FIG. 9

| | PDCCH Monitoring Occasion 1 | PDCCH Monitoring Occasion 2 | PDCCH Monitoring Occasion 3 | PDCCH Monitoring Occasion 4 |
|---|---|---|---|---|
| Carrier 1 (CBG-based Transmission, First DCI Format) | PDSCH 1 (First PDSCH Group): {C-DAI=1, T-DAI=1} | PDSCH 3 (First PDSCH Group): {C-DAI=2, T-DAI=4} | | PDSCH 6 (First PDSCH Group): {C-DAI=4, T-DAI=4} |
| Carrier 2 (TB-based Transmission, First DCI Format and Second DCI Format) | PDSCH 2 (Second PDSCH Group): {C-DAI=1, T-DAI=2} | PDSCH 4 (Second PDSCH Group): {C-DAI=2, T-DAI=4} | | PDSCH 7 (First PDSCH Group): {C-DAI=1, T-DAI=4} |
| Carrier 3 (TB-based Transmission, Second DCI Format) | | | PDSCH 5 (First PDSCH Group): {C-DAI=3, T-DAI=1} | PDSCH 8 (First PDSCH Group): {C-DAI=2, T-DAI=4} |

FIG. 10

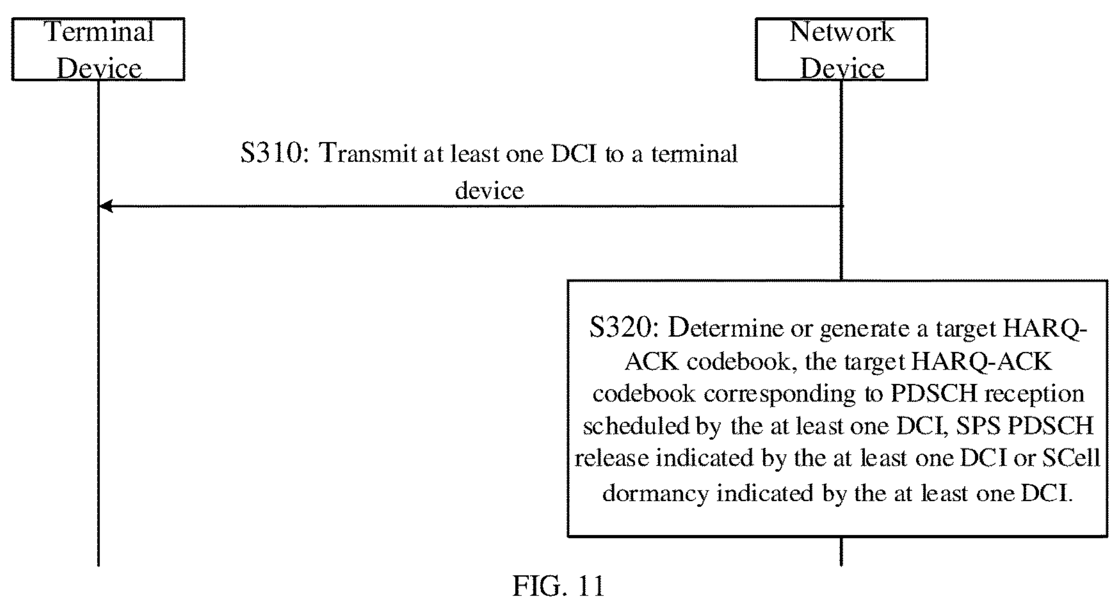

FIG. 11

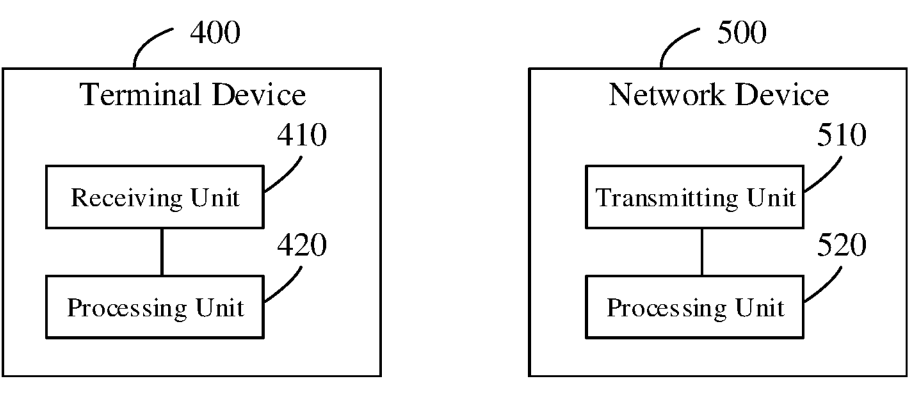
FIG. 12
FIG. 13
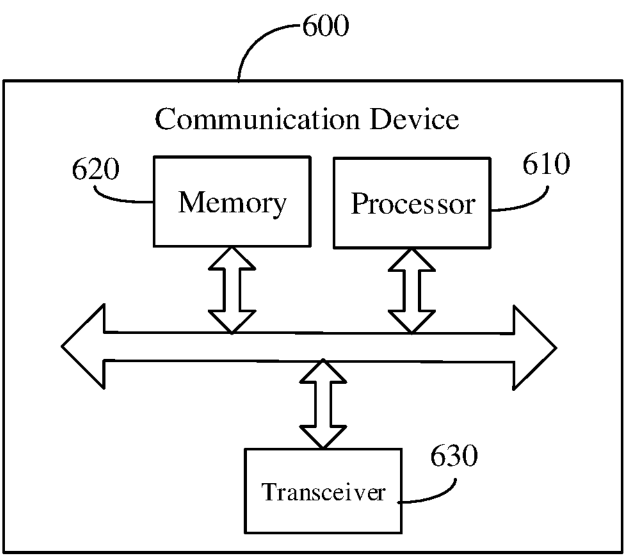
FIG. 14
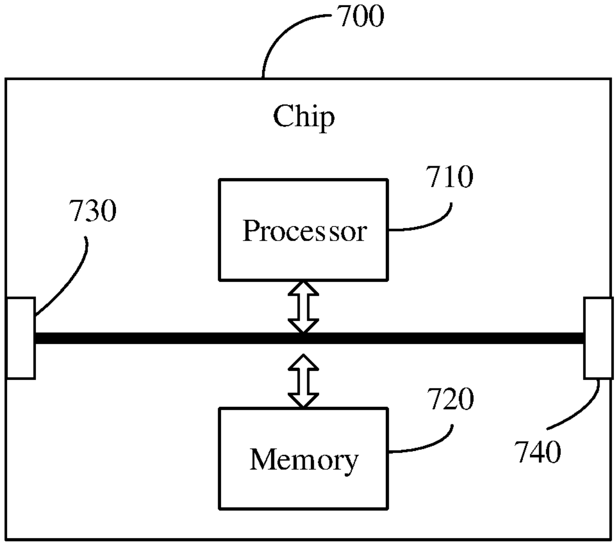
FIG. 15

WIRELESS COMMUNICATION METHODS, TERMINAL DEVICES, AND NETWORK DEVICE

CROSS-REFERENCE TO RELATED APPLICATIONS

This application is a continuation of International Application No. PCT/CN2021/092844 filed on May 10, 2021, the entire disclosure of which is incorporated herein by reference.

TECHNICAL FIELD

The embodiments of the present disclosure relate to communication technology, and more particularly, to a wireless communication method, a terminal device and a network device.

BACKGROUND

In Release 17 (Rel-17), in order to better support the Long Term Evolution (LTE) system and the New Radio (NR) system, Dynamic Spectrum Sharing (DSS) is introduced. For carriers where LTE and NR coexist, in order to avoid interference to the LTE system, transmissions in the NR system cannot use resources where Control Resource Sets (CORESETs) of the LTE system are located and resources where Physical Downlink Control Channel (PDCCH) of the LTE system is located. Therefore, on the carriers with such coexistence, the capacity of NR PDCCH will be affected.

Therefore, there is a need in the related art to improve scheduling of PDSCH to improve system performance.

SUMMARY

The embodiments of the present disclosure provide a wireless communication method, a terminal device, and a network device, capable of improving system performance by improving scheduling of PDSCH.

In a first aspect, the present disclosure provides a wireless communication method. The method includes: receiving at least one Downlink Control Information (DCI) transmitted by a network device; and determining or generating a target Hybrid Automatic Repeat reQuest Acknowledgement (HARQ-ACK) codebook, the target HARQ-ACK codebook corresponding to Physical Downlink Shared Channel (PDSCH) reception scheduled by the at least one DCI, Semi-Persistent Scheduling (SPS) PDSCH release indicated by the at least one DCI or Secondary Cell (SCell) dormancy indicated by the at least one DCI. The at least one DCI includes a first DCI format and/or a second DCI format. The first DCI format is used to schedule one PDSCH, and the second DCI format is used to schedule at least two PDSCHs corresponding to at least one PDSCH group.

In a second aspect, the present disclosure provides a wireless communication method. The method includes: transmitting at least one Downlink Control Information (DCI) to a terminal device; and determining or generating a target Hybrid Automatic Repeat reQuest Acknowledgement (HARQ-ACK) codebook, the target HARQ-ACK codebook corresponding to Physical Downlink Shared Channel (PDSCH) reception scheduled by the at least one DCI, Semi-Persistent Scheduling (SPS) PDSCH release indicated by the at least one DCI or Secondary Cell (SCell) dormancy indicated by the at least one DCI. The at least one DCI includes a first DCI format and/or a second DCI format, the first DCI format being used to schedule one PDSCH, and the second DCI format being used to schedule at least two PDSCHs corresponding to at least one PDSCH group.

In a third aspect, a terminal device is provided. The terminal device is configured to perform the method according to the above first aspect or any implementation thereof. In particular, the terminal device includes one or more functional modules configured to perform the method according to the above first aspect or any implementation thereof.

In an implementation, the terminal device may include a processing unit configured to perform functions related to information processing. For example, the processing unit may be a processor.

In an implementation, the terminal device may include a transmitting unit and/or a receiving unit. The transmitting unit is configured to perform transmitting related functions, and the receiving unit is configured to perform receiving related functions. For example, the transmitting unit may be a transmitter or transmitting device, and the receiving unit may be a receiver or receiving device. In another example, the terminal device may be a communication chip, the transmitting unit may be an input circuit or interface of the communication chip, and the transmitting unit may be an output circuit or interface of the communication chip.

In a fourth aspect, a network device is provided. The network device is configured to perform the method according to the above second aspect or any implementation thereof. In particular, the network device includes one or more functional modules configured to perform the method according to the above second aspect or any implementation thereof.

In an implementation, the network device may include a processing unit configured to perform functions related to information processing. For example, the processing unit may be a processor.

In an implementation, the network device may include a transmitting unit and/or a receiving unit. The transmitting unit is configured to perform transmitting related functions, and the receiving unit is configured to perform receiving related functions. For example, the transmitting unit may be a transmitter or transmitting device, and the receiving unit may be a receiver or receiving device. In another example, the network device may be a communication chip, the transmitting unit may be an input circuit or interface of the communication chip, and the transmitting unit may be an output circuit or interface of the communication chip.

In a fifth aspect, a terminal device is provided. The terminal device includes a processor and a memory. The memory has a computer program stored thereon, and the processor is configured to invoke and execute the computer program stored in the memory to perform the method according to the above first aspect or any implementation thereof.

In an implementation, one or more processors, and one or more memories are provided.

In an implementation, the memory may be integrated with the processor, or the memory may be separated from the processor.

In an implementation, the terminal device may further include a transmitter (transmitting device) and a receiver (receiving device).

In a sixth aspect, a network device is provided. The network device includes a processor and a memory. The memory has a computer program stored thereon, and the processor is configured to invoke and execute the computer program stored in the memory to perform the method according to the above second aspect or any implementation thereof.

In an implementation, one or more processors, and one or more memories are provided.

In an implementation, the memory may be integrated with the processor, or the memory may be separated from the processor.

In an implementation, the network device may further include a transmitter (transmitting device) and a receiver (receiving device).

In a seventh aspect, a chip is provided. The chip is configured to perform the method according to any of the above first and second aspects or any implementation thereof. In particular, the chip includes a processor configured to invoke and execute a computer program from a memory, to cause a device provided with the chip to perform the method according to any of the above first and second aspects or any implementation thereof.

In an eighth aspect, a computer-readable storage medium is provided. The computer-readable storage medium stores a computer program that causes a computer to perform the method according to any of the above first and second aspects or any implementation thereof.

In a ninth aspect, a computer program product is provided. The computer program product includes computer program instructions that cause a computer to perform the method according to any of the above first and second aspects or any implementation thereof.

In a tenth aspect, a computer program is provided. The computer program, when executed on a computer, causes the computer to perform the method according to any of the above first and second aspects or any implementation thereof.

With the above technical solutions, the second DCI format is designed for scheduling at least two PDSCHs, which improves the scheduling of the PDSCH, thereby improving system performance. In particular, for carriers where LTE and NR coexist, by scheduling at least two PDSCHs using the second DCI format, it is possible to avoid NR's interference to the LTE system. Even if the NR transmission cannot use resources where the LTE CORESET is located and resources where LTE PDCCH is located, it ensures that the terminal device can perform HARQ-ACK feedback for the PDSCH, so as to guarantee the communication quality. In addition, the at least two PDSCHs correspond to at least one PDSCH group, which facilitates constructing sub-codebooks for different PDSCH groups. Further, for the second DCI format, it is beneficial to improving the capability of combating missed detection of DCI.

BRIEF DESCRIPTION OF DRAWINGS

FIG. 1 shows an example of a communication system architecture in which an embodiment of the present disclosure can be applied.

FIG. 2 shows an example of determining DAI by accumulating the number of PDSCH receptions according to embodiment of the present disclosure.

FIG. 3 and FIG. 4 show examples of a terminal's capability of combating missed detection of DCI according to an embodiment of the present disclosure.

FIG. 5 is a schematic flowchart illustrating a wireless communication method according to an embodiment of the present disclosure.

FIG. 6 and FIG. 7 show examples of an order of sub-codebooks in a target HARQ-ACK codebook according to an embodiment of the present disclosure.

FIG. 8 shows an example of a target HARQ-ACK codebook when a terminal is not configured with a first parameter or a second parameter according to an embodiment of the present disclosure.

FIG. 9 shows an example of a target HARQ-ACK codebook for CBG-based transmission when a terminal is not configured with a first parameter or a second parameter according to an embodiment of the present disclosure.

FIG. 10 shows an example of a first PDSCH group and a second PDSCH group sharing a T-DAI indication field according to an embodiment of the present disclosure.

FIG. 11 is another schematic flowchart illustrating a wireless communication method according to an embodiment of the present disclosure.

FIG. 12 is a schematic block diagram of a terminal device according to an embodiment of the present disclosure.

FIG. 13 is a schematic block diagram of a network device according to an embodiment of the present disclosure.

FIG. 14 is a schematic block diagram of a communication device according to an embodiment of the present disclosure.

FIG. 15 is a schematic block diagram of a chip according to an embodiment of the present disclosure.

DESCRIPTION OF EMBODIMENTS

The technical solutions in the embodiments of the present disclosure will be described below with reference to the figures. Obviously, the described embodiments are only some embodiments, rather than all embodiments, of the present disclosure. All other embodiments obtained by those skilled in the art based on the embodiments in the present disclosure without inventive efforts are to be encompassed by the scope of the present disclosure.

The solutions according to the embodiments of the present disclosure can be applied to various communication systems, including for example: Global System of Mobile Communication (GSM), Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, New Radio (NR) system, evolved NR system, LTE-based access to unlicensed spectrum (LTE-U) system, NR-based access to unlicensed spectrum (NR-U) system, Non-Terrestrial Network (NTN) system, Universal Mobile Telecommunication System (UMTS), Wireless Local Area Networks (WLAN), Wireless Fidelity (WiFi), the $5^{th}$ Generation (5G) system, or other communication systems.

Generally, traditional communication systems can support a limited number of connections and are easy to implement. However, with the development of communication technology, mobile communication systems will support not only traditional communication, but also e.g., Device to Device (D2D) communication, Machine to Machine (M2M) communication, and Machine Type Communication (MTC), Vehicle to Vehicle (V2V) communication, Vehicle to everything (V2X) communication, etc. The embodiments of the present disclosure can also be applied to these communication systems.

Optionally, the communication system of an embodiment of the present disclosure may be applied to a Carrier Aggregation (CA) scenario, a Dual Connectivity (DC) scenario, a Standalone (SA) network deployment scenario, and the like.

Optionally, the communication system of an embodiment of the present disclosure may be applied to unlicensed spectrum or shared spectrum. Alternatively, the communication system of an embodiment of the present disclosure may be applied to licensed spectrum or non-shared spectrum.

The embodiments of the present disclosure are described in conjunction with a network device and a terminal device. The terminal device may refer to a User Equipment (UE), an access terminal, a user unit, a user station, a mobile station, a remote station, a remote terminal, a mobile device, a user terminal, a terminal, a wireless communication device, a user agent, or a user device.

The terminal device may be a station (ST) in a WLAN, a cellular phone, a cordless phone, a Session Initiation Protocol (SIP) phone, a Wireless Local Loop (WLL) station, a Personal Digital Assistant (PDA) device, a handheld device or a computing device having a wireless communication function, another processing device connected to a wireless modem, a vehicle-mounted device, a wearable device, a terminal device in the next generation communication system (e.g., NR network), or a terminal device in a future evolved Public Land Mobile Network (PLMN), etc.

In the embodiments of the present disclosure, the terminal device can be deployed on land, including indoor or outdoor, handheld, worn, or vehicle-mounted, deployed on water (e.g., on a ship), or deployed in the air (e.g., on an airplane, a balloon, a satellite, etc.).

In the embodiments of the present disclosure, the terminal device may be a mobile phone, a tablet computer (Pad), a computer with a wireless transceiver function, a Virtual Reality (VR) terminal device, an Augmented Reality (AR) terminal device, a wireless terminal in industrial control, a vehicle-mounted terminal device, a wireless terminal device in self driving, a wireless terminal device in remote medical, a wireless terminal device in smart grid, a wireless terminal device in transportation safety, a wireless terminal device in smart city, or a wireless terminal device in smart home.

As non-limiting examples, in an embodiment of the present disclosure, the terminal device may also be a wearable device. The wearable device, also known as wearable smart device, is a general term for wearable devices that are intelligently designed and developed from everyday wear, such as glasses, gloves, watches, clothes, and shoes, by applying wearable technologies. A wearable device is a portable device that can be directly worn on or integrated into a user's clothes or accessories. A wearable device is not only a kind of hardware device, but can also provide powerful functions based on software support, data interaction, and cloud interaction. In a broad sense, wearable smart devices may include full-featured, large-sized devices that can provide full or partial functions without relying on smart phones, such as smart watches or smart glasses, and devices that only focus on a certain type of application function and need to cooperate with other devices such as smart phones for use, such as various smart bracelets and smart jewelries for physical sign monitoring.

In an embodiment of the present disclosure, the network device may be a device communicating with mobile devices. The network device may be an Access Point (AP) in a WLAN, a base station such as Base Transceiver Station (BTS) in a GSM system or a CDMA system, a base station such as NodeB (NB) in a WCDMA system, a base station such as Evolutional Node (eNB or eNodeB) in an LTE system, or a relay station, an access point, a vehicle-mounted device, a wearable device, a network device or base station (e.g., gNB) in an NR network, a network device in a future evolved PLMN, or a network device in an NTN.

As a non-limiting example, in an embodiment of the present disclosure, the network device may have mobile characteristics, e.g., the network device may be a mobile device. Optionally, the network device may be a satellite or a balloon station. For example, the satellite may be a Low Earth Orbit (LEO) satellite, a Medium Earth Orbit (MEO) satellite, a Geostationary Earth Orbit (GEO) satellite, a High Elliptical Orbit (HEO) satellite, etc. Optionally, the network device may also be a base station provided in a location such as land or water.

In the embodiment of the present disclosure, the network device may provide services for a cell, and the terminal device may communicate with the network device over transmission resources, e.g., frequency domain resources or frequency spectral resources, used in the cell. The cell may be a cell corresponding to the network device (e.g., base station). The cell may belong to a macro base station or a base station corresponding to a small cell. The small cell here may include a metro cell, a micro cell, a pico cell, a femto cell, or the like. These small cells have characteristics such as small coverage and low transmission power, and are suitable for providing high-rate data transmission services.

Exemplarily, FIG. 1 shows a communication system 100 in which an embodiment of the present disclosure can be applied. As shown in FIG. 1, the communication system 100 may include a network device 110 which may be a device communicating with a terminal device 120 (or referred to as communication terminal or terminal). The network device 110 may provide communication coverage for a particular geographic area, and may communicate with terminal devices located within the coverage.

FIG. 1 exemplarily shows one network device and two terminal devices. Optionally, the communication system 100 may include multiple network devices, and the coverage of each network device may include other numbers of terminal devices. The embodiment of the present disclosure is not limited to this.

Optionally, the communication system 100 may also include other network entities such as a network controller or a Mobility Management Entity (MME). The embodiment of the present disclosure is not limited to this.

It can be appreciated that, in the embodiments of the present disclosure, a device having a communication function in a network/system may be referred to as a communication device. Taking the communication system 100 shown in FIG. 1 as an example, the communication devices may include the network device 110 and the terminal device 120 with communication functions. The network device 110 and the terminal device 120 may be the specific devices described above, and details thereof will be omitted here. The communication devices may also include other devices in the communication system 100, e.g., other network entities such as a network controller, an MME, etc., and the embodiment of the present disclosure is not limited to any of these examples.

In addition, the terms "system" and "network" may often be used interchangeably herein. The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

The terms used in the embodiments of the present disclosure are provided only for explaining the specific embodiments of the present disclosure, rather than limiting the present disclosure. The terms such as "first", "second", etc., as used in the description, claims and figures of the present disclosure are used for distinguishing different objects from each other, rather than defining a specific order. In addition, the terms such as "include" and "have" and any variants thereof are intended to cover non-exclusive inclusion.

It can be appreciated that the term "indication" as used in the embodiments of the present disclosure may be a direct indication, an indirect indication, or an association. For example, if A indicates B, it may mean that A directly indicates B, e.g., B can be obtained from A. Alternatively, it may mean that A indicates B indirectly, e.g., A indicates C and B can be obtained from C. Alternatively, it may mean that there is an association between A and B.

In the description of the embodiments of the present disclosure, the term "corresponding" may mean that there is a direct or indirect correspondence between the two, or may mean that there is an association between the two, or that they are in a relation of indicating and indicated, configuring or configured, or the like.

The NR Rel-15 system supports two types of HARQ-ACK codebooks: Type-1 HARQ-ACK codebook and Type-2 HARQ-ACK codebook.

To facilitate understanding of the present disclosure, the Type-2 HARQ-ACK codebook will be described below.

The Type-2 HARQ-ACK codebook uses a dynamic method to determine the number of bits in the HARQ-ACK codebook, that is, the terminal determines the number of HARQ-ACK feedback bits required for the actual scheduled PDSCHs, SPS PDSCH release indications, and SCell dormancy indications according to the received DCI. In particular, in order to deal with the problem of missed detection of PDCCHs other than the last PDCCH, a Downlink Assignment Index (DAI) indication is introduced. FIG. 2 shows an example of determining a DAI by accumulating the number of PDSCH receptions according to an embodiment of the present disclosure. Assuming that the base station transmits PDSCHs based on TB transmission on a single carrier, and each DCI can only schedule 1 code word, as shown in FIG. 2, the base station transmits PDSCH 1 to PDSCH 4 on Carrier 1, corresponding to DAI=1 to 4, respectively. The terminal fails to receive PDSCH 3 due to missed detection of the PDCCH scheduling PDSCH 3, but the terminal receives PDSCH 4 corresponding to DAI=4, and then the terminal can determine that PDSCH 3 was missed, and will feed back a 4-bit HARQ-ACK to the base station.

In a multi-carrier scenario, the DAI is further divided into a Counter-DAI (C-DAI) and a Total DAI (T-DAI).

Here, the C-DAI represents the accumulative number of PDSCH receptions, SPS PDSCH releases or indicated SCell dormancies associated with the DCI format up to the current serving cell and the current PDCCH monitoring occasion (A value of the counter downlink assignment indicator (DAI) field in DCI formats denotes the accumulative number of {serving cell, PDCCH monitoring occasion}-pair(s) in which PDSCH reception(s), SPS PDSCH release indication(s) or SCell dormancy indication(s) associated with the DCI formats is present up to the current serving cell and current PDCCH monitoring occasion).

The T-DAI indicates the accumulative number of PDSCH receptions, SPS PDSCH releases or indicated SCell dormancies associated with the DCI format on all serving cells up to the current PDCCH monitoring occasion (The value of the total DAI, when present [5, TS 38.212], in a DCI format denotes the total number of {serving cell, PDCCH monitoring occasion}-pair(s) in which PDSCH reception(s), SPS PDSCH release indication(s) or SCell dormancy indication(s) associated with DCI formats is present, up to the current PDCCH monitoring occasion m and is updated from PDCCH monitoring occasion to PDCCH monitoring occasion).

Taking the DCI containing 2-bit C-DAI and 2-bit T-DAI as an example, the process of constructing a type-2 HARQ-ACK codebook is as follows.

All PDCCH monitoring occasions are traversed in an ascending order, and all serving cell indexes are traversed in an ascending order. A first temporary value is initialized to 0; j is initialized to 0, where j represents the number of times the C-DAI reaches the maximum value (the counter DAI is counted cyclically, i.e., 1, 2, 3, 4, 1, 2, 3, 4, 1, 2, . . . , where the first 1 means 1, and the second 1 actually means 5). If on the PDCCH monitoring occasion m, there is a PDSCH, or a PDCCH indicating SPS PDSCH release or SCell dormancy on a serving cell c, the relationship between the value of C-DAI and the first temporary value is determined. If the C-DAI is smaller than or equal to the first temporary value, then j+1; or otherwise, the first temporary value is updated to be the value of the C-DAI. If the terminal is configured to receive only one TB on each carrier, the HARQ-ACK bit of the cell is filled in the (4*j+C-DAI−1)-th bit. If the terminal is configured to receive 2 TBs on at least one carrier, and harq-ACK-SpatialBundlingPUCCH is configured, the logical ANDed value of HARQ-ACKs for the two TBs of the cell is filled in the (4*j+C-DAI−1)-th bit. If the terminal is configured to receive 2 TB on at least one carrier, and harq-ACK-SpatialBundlingPUCCH is not configured, the HARQ-ACK bit information for the first TB of the cell is filled in the (4*j+2*(C-DAI−1))-th bit, and the HARQ-ACK information for the second TB of the cell is filled in the (4*j+2*(C-DAI−1)+1)-th bit. The total number of HARQ-ACK bits is determined, denoted as $O^{ack}$. If some bit positions are not filled with the corresponding HARQ-ACK information during the above process, these bit positions are filled with NACK.

In addition, NR also supports Code Block Group (CBG)-based transmission. For CBG-based downlink reception, the terminal assigns all Code blocks (CBs) contained in a Transmission Block (TB) to S CBGs as averagely as possible, where S represents the number of CBGs included in each TB. S is determined as S=min (K, C), where K is the maximum number of CBGs for each TB as configured by the base station, and C is the number of CBs included in each TB.

If the terminal is configured with CBG-based transmission on one downlink cell set $$N_{cells}^{DL,CBG}$$

and is not configured with CBG-based transmission on another downlink cell set $$N_{cells}^{DL,TB},$$

the terminal can determine the HARQ-ACK codebook according to the following rules or methods.

The terminal generates two HARQ-ACK sub-codebooks, one of which includes HARQ-ACK bits corresponding to SPS PDSCH releases, SPS PDSCH receptions, Scell dormancy indications, TB-based PDSCH transmissions on cells in $$N_{cells}^{DL,TB}$$

and $$N_{cells}^{DL,CBG},$$

and the other includes HARQ-ACK bits corresponding to CBG-based transmissions on cells in $$N_{cells}^{DL,CBG}.$$

Then, the terminal concatenates the two HARQ-ACK sub-codebooks together, for example, by appending one HARQ-ACK sub-codebook to another HARQ-ACK sub-codebook, to form a final HARQ-ACK codebook.

In Release 17 (Rel-17), in order to better support the Long Term Evolution (LTE) system and the New Radio (NR) system, Dynamic Spectrum Sharing (DSS) is introduced. For carriers where LTE and NR coexist, in order to avoid interference to the LTE system, transmissions in the NR system cannot use resources where Control Resource Sets (CORESETs) of the LTE system are located and resources where Physical Downlink Control Channel (PDCCH) of the LTE system is located. Therefore, on the carriers with such coexistence, the capacity of NR PDCCH will be affected.

In view of the above problem, the present disclosure provides a technical solution in which one DCI is designed for scheduling PDSCHs on at least two different carriers, for example, one DCI on a PCell or a SCell can schedule PDSCHs on the PCell and the SCell. Based on this, whether and how to transmit HARQ-ACKs corresponding to PDSCHs on at least two carriers on a same PUCCH resource is a problem that needs to be further improved. For the convenience of describing the solution of the present disclosure, in the present disclosure, DCI used to schedule a PDSCH on one carrier will be denoted as a first DCI format, and DCI used to schedule PDSCHs on at least two carriers will be denoted as a second DCI format.

If the scenario where one DCI schedules PDSCHs on two carriers is not considered, taking a 2-bit C-DAI as an example, according to the cyclic counting mechanism of the DAI and the generation mechanism of the type-2 HARQ-ACK codebook, a terminal can achieve the performance of dealing with missed detection of up to 3 consecutive pieces of DCI. FIG. 3 shows an example a terminal's capability of combating missed detection of DCI on one single carrier according to an embodiment of the present disclosure. As shown in FIG. 3, taking TB-based transmission as an example, according to the generation mechanism of the type-2 codebook, if the terminal first receives one DCI scheduling PDSCH 1, which contains DAI=1, and then receives one DCI scheduling PDSCH 5, which contains DAI=1, the terminal can know that DAI has been counted to the maximum value and then counted to 1 again, and the detections of DCI containing DAI=2/3/4 are missed.

However, if the scenario where one DCI schedules PDSCHs on two carriers is considered, if the DAI (such as C-DAI and/or T-DAI) follows the above design and counting principles, the performance of missed detection of DCI will be degraded. FIG. 4 shows an example a terminal's capability of combating missed detection of DCI on multiple carriers according to an embodiment of the present disclosure. As shown in FIG. 4, taking TB-based transmission as an example, the base station transmits first DCI on PDCCH monitoring occasion 1, for scheduling PDSCH 1 on carrier 1 and PDSCH 2 on carrier 2, transmits second DCI on PDCCH monitoring occasion 2, for scheduling PDSCH 3 on carrier 1 and PDSCH 4 on carrier 2, and transmits third DCI on PDCCH monitoring occasion 3, for scheduling PDSCH 5 on carrier 1. If the terminal only misses detection of the first DCI, it can know from the second DCI containing DAI=3 that the detection of the DCI containing DAI=1 and DAI=2 has been missed. However, if the terminal misses detection of the first two DCI, the terminal will consider the third DCI to be the first DCI and have no way of knowing that detections of two pieces of DCI containing DAI=1/2/3/4 are missed.

It can be seen that, under the premise of not changing the DAI design, in the scenario where one DCI schedules PDSCHs on two carriers, the terminal can only achieve the performance of dealing with missed detection of one consecutive DCI.

In the present disclosure, at least two PDSCHs scheduled by the second DCI format correspond to at least one PDSCH group, which is conducive to constructing sub-codebooks for different PDSCH groups. Further, for the second DCI format, it is beneficial to improving the capability of combating missed detection of DCI. Specifically, in the scenario where one DCI schedules PDSCH transmissions on two different carriers, the HARQ-ACKs for the PDSCHs on different carriers are fed back on a same PUCCH resource. With the mechanism of grouping the HARQ-ACK information corresponding to PDSCHs on different carriers or different DCI formats to construct the Type-2 HARQ-ACK codebook, it is possible to achieve the same capability of combating missed detection of DCI as in R15/R16 without increasing the number of DAI bits.

FIG. 5 is a schematic flowchart illustrating a wireless communication method 200 according to an embodiment of the present disclosure, and the method 200 may be interactively executed by a terminal device and a network device. The terminal device shown in FIG. 5 may be the terminal device shown in FIG. 1, and the network device shown in FIG. 5 may be the access network device shown in FIG. 1.

As shown in FIG. 5, the method 200 may include part or all of the following content.

At S210, at least one Downlink Control Information (DCI) transmitted by a network device is received.

At S220, a target Hybrid Automatic Repeat reQuest Acknowledgement (HARQ-ACK) codebook is determined or generated. The target HARQ-ACK codebook corresponds to Physical Downlink Shared Channel (PDSCH) reception scheduled by the at least one DCI, Semi-Persistent Scheduling (SPS) PDSCH release indicated by the at least one DCI or Secondary Cell (SCell) dormancy indicated by the at least one DCI.

Here, the at least one DCI includes a first DCI format and/or a second DCI format. The first DCI format is used to schedule one PDSCH, and the second DCI format is used to schedule at least two PDSCHs corresponding to at least one PDSCH group.

As an example, after grouping the PDSCH receptions scheduled by each of the at least one DCI, the SPS PDSCH release indications by each of the at least one DCI, or the SCell dormancy indications by each of the at least one DCI, corresponding HARQ-ACK bits are determined or generated, and these HARQ-ACK bits can be used for constructing a target HARQ-ACK codebook. Optionally, the at least one PDSCH corresponds to at least one HARQ-ACK sub-codebook, respectively, and the at least one HARQ-ACK sub-codebook is used for constructing the target HARQ-ACK codebook.

With the above technical solutions, the second DCI format is designed for scheduling at least two PDSCHs, which improves the scheduling of the PDSCH, thereby improving system performance. In particular, for carriers where LTE and NR coexist, by scheduling at least two PDSCHs using the second DCI format, it is possible to avoid NR's interference to the LTE system. Even if the NR transmission cannot use resources where the LTE CORESET is located and resources where LTE PDCCH is located, it ensures that the terminal device can perform HARQ-ACK feedback for the PDSCH, so as to guarantee the communication quality. In addition, the at least two PDSCHs correspond to at least one PDSCH group, which facilitates constructing sub-codebooks for different PDSCH groups. Further, for the second DCI format, it is beneficial to improving the capability of combating missed detection of DCI.

It should be noted that, the embodiment of the present disclosure is not limited to any specific type of the first DCI format. For example, the first DCI format may include, but not limited to: DCI format 1_0/1_1/1_2.

In some embodiments, the at least two PDSCHs may correspond to at least two PDSCH groups respectively. As another example, the at least two PDSCHs may correspond to one PDSCH group, and the one PDSCH may correspond to another PDSCH group.

In some embodiments, S220 may include: determining or generating first HARQ-ACK information or a first HARQ-ACK sub-codebook, the first HARQ-ACK information or the first HARQ-ACK sub-codebook including HARQ-ACK bits corresponding to PDSCHs in a first PDSCH group; the target HARQ-ACK codebook including the first HARQ-ACK sub-codebook or the first HARQ-ACK information, and the at least one PDSCH group including the first PDSCH group.

In some implementations, when each of the at least one DCI has the first DCI format, the target HARQ-ACK codebook may only include the first HARQ-ACK sub-codebook or the first HARQ-ACK information.

In some implementations, the first HARQ-ACK sub-codebook or the first HARQ-ACK information may be applicable to a scenario where CBG-based PDSCH reception is not supported.

In some implementations, when the second DCI format schedules two PDSCHs, the first PDSCH group may include at least one of: a PDSCH scheduled by the first DCI format or a first PDSCH scheduled by the second DCI format. The first PDSCH may be a PDSCH on a serving cell with a smaller serving cell index among the two PDSCHs. Of course, in other alternative embodiments, the first PDSCH may be a PDSCH on a serving cell with a larger serving cell index among the two PDSCHs.

In some implementations, when the second DCI format schedules more than two PDSCHs, the first PDSCH group may include at least one of: a PDSCH scheduled by the first DCI format or X PDSCHs among the PDSCHs scheduled by the second DCI format. The X PDSCHs may be PDSCHs on X serving cells with smaller serving cell indexes among the at least two PDSCHs, where X is a positive integer. Of course, in other alternative embodiments, the X PDSCHs may be PDSCHs on X serving cells with larger serving cell indexes among the at least two PDSCHs.

In some implementations, the first HARQ-ACK information or the first HARQ-ACK sub-codebook may further include a HARQ-ACK bit corresponding to the SPS PDSCH release or the SCell dormancy.

In other words, the DAI (such as C-DAI and/or T-DAI) corresponding to the SPS PDSCH release indication or the SCell dormancy indication may be counted together with the first PDSCH group.

In some implementations, when a terminal is not configured with a first parameter and is configured with a second parameter as 2, a 2-bit HARQ-ACK may be determined or generated for the PDSCHs in the first PDSCH group, the SPS PDSCH release, or the SCell dormancy; or otherwise a 1-bit HARQ-ACK is determined or generated. The first parameter is used to enable HARQ-ACK spatial bundling, and the second parameter is used to indicate a maximum number of code words that is schedulable by one DCI. For example, when the terminal is not configured with the first parameter and the terminal is not configured with the second parameter, a 1-bit HARQ-ACK is determined or generated for the PDSCHs in the first PDSCH group, the SPS PDSCH release or the SCell dormancy. The second parameter may be a maximum number of code words that is schedulable by DCI (maxNrofCodeWordsScheduledByDCI).

In other words, for a carrier used to receive the first DCI format and for a carrier used to receive the second DCI format for scheduling the first PDSCH, the first parameter is not configured and the configured second parameter is 2, a 2-bit HARQ-ACK is determined or generated for the PDSCHs in the first PDSCH group, the SPS PDSCH release or the SCell dormancy; or otherwise, a 1-bit HARQ-ACK is determined or generated. For example, for a carrier used to receive the first DCI format and for a carrier used to receive the second DCI format for scheduling the first PDSCH, the first parameter is not configured and the second parameter is not configured, and a 1-bit HARQ-ACK is determined or generated for each PDSCH reception scheduled by the first DCI format, the SPS PDSCH release, or the SCell dormancy.

In some embodiments, S220 may include: determining or generating second HARQ-ACK information or a second HARQ-ACK sub-codebook, the second HARQ-ACK information or the second HARQ-ACK sub-codebook including HARQ-ACK bits corresponding to PDSCHs in a second PDSCH group; the target HARQ-ACK codebook including the second HARQ-ACK sub-codebook or the second HARQ-ACK information, the at least one PDSCH group including the second PDSCH group, and the first PDSCH group being different from the second PDSCH group.

In some implementations, each of the at least one DCI may have the second DCI format, the PDSCHs scheduled by the at least one DCI may all belong to the second PDSCH group, and the target HARQ-ACK codebook may only include the second HARQ-ACK sub-codebook or the second HARQ-ACK information.

In some implementations, the second HARQ-ACK sub-codebook or the second HARQ-ACK information may be applicable to a scenario where CBG-based PDSCH reception is not supported.

In some implementations, when the second DCI format schedules two PDSCHs, the second PDSCH group may include: a second PDSCH scheduled by the second DCI format. The second PDSCH may be a PDSCH on a serving cell with a larger serving cell index among the two PDSCHs. Of course, in other alternative embodiments, the second PDSCH may be a PDSCH on a serving cell with a smaller serving cell index among the two PDSCHs.

In some implementations, when the second DCI format schedules more than two PDSCHs, the second PDSCH group may include: Y PDSCHs among PDSCHs scheduled by the second DCI format. The Y PDSCHs may be PDSCHs on Y serving cells with larger serving cell indexes among the at least two PDSCHs, where Y is a positive integer. Of course, in other alternative embodiments, the Y PDSCHs may be PDSCHs on Y serving cells with smaller serving cell indexes among the at least two PDSCHs.

In some implementations, when the terminal is not configured with a first parameter and is configured with a second parameter as 2, a 2-bit HARQ-ACK may be determined or generated for the PDSCHs in the second PDSCH group; or otherwise, a 1-bit HARQ-ACK may be determined or generated. The first parameter is used to enable HARQ-ACK spatial bundling, and the second parameter is used to indicate a maximum number of code words that is schedulable by one DCI. For example, when the terminal is not configured with the first parameter and the terminal is not configured with the second parameter, a 1-bit HARQ-ACK may be determined or generated for the PDSCHs in the second PDSCH group. The second parameter may be a maximum number of code words that is schedulable by DCI (maxNrofCodeWordsScheduledByDCI).

In other words, for a carrier used to receive the second DCI format for scheduling the second PDSCH, the first parameter is not configured and the configured second parameter is 2, and a 2-bit HARQ-ACK is determined or generated for the at least two PDSCHs scheduled by each second DCI format; or otherwise, a 1-bit HARQ-ACK is generated. For example, for a carrier used to receive the second DCI format for scheduling the second PDSCH, the first parameter is not configured and the second parameter is not configured, and a 1-bit HARQ-ACK is determined or generated.

In some embodiments, S220 may include: determining or generating first HARQ-ACK information or a first HARQ-ACK sub-codebook, the first HARQ-ACK information or the first HARQ-ACK sub-codebook including HARQ-ACK bits corresponding to PDSCHs in a first PDSCH group, and the at least one PDSCH group including the first PDSCH group; determining or generating second HARQ-ACK information or a second HARQ-ACK sub-codebook, the second HARQ-ACK information or the second HARQ-ACK sub-codebook including HARQ-ACK bits corresponding to PDSCHs in a second PDSCH group; the at least one PDSCH group including the second PDSCH group, and the first PDSCH group being different from the second PDSCH group; and appending the second HARQ-ACK sub-codebook or second HARQ-ACK information to the first HARQ-ACK sub-codebook or the first HARQ-ACK information to form the HARQ-ACK codebook; or appending the first HARQ-ACK sub-codebook or the first HARQ-ACK information to the second HARQ-ACK sub-codebook or the second HARQ-ACK information to form the HARQ-ACK codebook.

As an example, the terminal constructs the first HARQ-ACK information or the first HARQ-ACK sub-codebook, the first HARQ-ACK information or the first HARQ-ACK sub-codebook including HARQ-ACK bits corresponding to PDSCHs in the first PDSCH group, the SPS PDSCH release indications, and the SCell dormancy indications. The terminal constructs the second HARQ-ACK information or the second HARQ-ACK sub-codebook, the second HARQ-ACK information or the second HARQ-ACK sub-codebook including HARQ-ACK bits corresponding to PDSCHs in the second PDSCH group. The terminal appends the second HARQ-ACK information or the second HARQ-ACK sub-codebook to the first HARQ-ACK information or the first HARQ-ACK sub-codebook, or the terminal appends the first HARQ-ACK information or the first HARQ-ACK sub-codebook to the second HARQ-ACK information or the second HARQ-ACK sub-codebook, such that they are multiplexed and transmitted on a PUCCH resource.

In some implementations, when the second DCI format schedules two PDSCHs, the first PDSCH group may include at least one of: a PDSCH scheduled by the first DCI format or a first PDSCH scheduled by the second DCI format. The first PDSCH may be a PDSCH on a serving cell with a smaller serving cell index among the two PDSCHs. Of course, in other alternative embodiments, the first PDSCH may be a PDSCH on a serving cell with a larger serving cell index among the two PDSCHs.

In some implementations, when the second DCI format schedules more than two PDSCHs, the first PDSCH group may include at least one of: a PDSCH scheduled by the first DCI format or X PDSCHs among the PDSCHs scheduled by the second DCI format. The X PDSCHs may be PDSCHs on X serving cells with smaller serving cell indexes among the at least two PDSCHs, where X is a positive integer. Of course, in other alternative embodiments, the X PDSCHs may be PDSCHs on X serving cells with larger serving cell indexes among the at least two PDSCHs.

In some implementations, the first HARQ-ACK information or the first HARQ-ACK sub-codebook may further include a HARQ-ACK bit corresponding to the SPS PDSCH release or the SCell dormancy.

In some implementations, when a terminal is not configured with a first parameter and is configured with a second parameter as 2, a 2-bit HARQ-ACK may be determined or generated for the PDSCHs in the first PDSCH group, the SPS PDSCH release, or the SCell dormancy; or otherwise a 1-bit HARQ-ACK is determined or generated. The first parameter is used to enable HARQ-ACK spatial bundling, and the second parameter is used to indicate a maximum number of code words that is schedulable by one DCI. For example, when the terminal is not configured with the first parameter and the terminal is not configured with the second parameter, a 1-bit HARQ-ACK is determined or generated for the PDSCHs in the first PDSCH group, the SPS PDSCH release or the SCell dormancy. The first parameter may also be used as indication information, for example, 1-bit information. Of course, in other alternative embodiments, the terminal device not being configured with the first parameter can also be understood as the terminal device being configured with a parameter indicating that HARQ-ACK spatial bundling is not enabled. The second parameter may be a maximum number of code words that is schedulable by DCI (maxNrofCodeWordsScheduledByDCI).

In other words, for a carrier used to receive the first DCI format and for a carrier used to receive the second DCI format for scheduling the first PDSCH, the first parameter is not configured and the configured second parameter is 2, a 2-bit HARQ-ACK is determined or generated for the PDSCHs in the first PDSCH group, the SPS PDSCH release or the SCell dormancy; or otherwise, a 1-bit HARQ-ACK is determined or generated. For example, for a carrier used to receive the first DCI format and for a carrier used to receive the second DCI format for scheduling the first PDSCH, the first parameter is not configured and the second parameter is not configured, and a 1-bit HARQ-ACK is determined or generated for each PDSCH reception scheduled by the first DCI format, the SPS PDSCH release, or the SCell dormancy.

In some implementations, when the second DCI format schedules two PDSCHs, the second PDSCH group may include: a second PDSCH scheduled by the second DCI format. The second PDSCH may be a PDSCH on a serving cell with a larger serving cell index among the two PDSCHs. Of course, in other alternative embodiments, the second PDSCH may be a PDSCH on a serving cell with a smaller serving cell index among the two PDSCHs.

In some implementations, when the second DCI format schedules more than two PDSCHs, the second PDSCH group may include: Y PDSCHs among PDSCHs scheduled by the second DCI format. The Y PDSCHs may be PDSCHs on Y serving cells with larger serving cell indexes among the at least two PDSCHs, where Y is a positive integer. Of course, in other alternative embodiments, the Y PDSCHs may be PDSCHs on Y serving cells with smaller serving cell indexes among the at least two PDSCHs.

In some implementations, when the terminal is not configured with a first parameter and is configured with a second parameter as 2, a 2-bit HARQ-ACK may be determined or generated for the PDSCHs in the second PDSCH group; or otherwise, a 1-bit HARQ-ACK may be determined or generated. The first parameter is used to enable HARQ-ACK spatial bundling, and the second parameter is used to indicate a maximum number of code words that is schedulable by one DCI. For example, when the terminal is not configured with the first parameter and the terminal is not configured with the second parameter, a 1-bit HARQ-ACK may be determined or generated for the PDSCHs in the second PDSCH group. The first parameter may also be used as indication information, for example, 1-bit information. Of course, in other alternative embodiments, the terminal device not being configured with the first parameter can also be understood as the terminal device being configured with a parameter indicating that HARQ-ACK spatial bundling is not enabled. The second parameter may be a maximum number of code words that is schedulable by DCI (maxNrofCodeWordsScheduledByDCI).

In other words, for a carrier used to receive the second DCI format for scheduling the second PDSCH, the first parameter is not configured and the configured second parameter is 2, and a 2-bit HARQ-ACK is determined or generated for each of the at least two PDSCHs scheduled by second DCI format; or otherwise, a 1-bit HARQ-ACK is generated. For example, for a carrier used to receive the second DCI format for scheduling the second PDSCH, the first parameter is not configured and the second parameter is not configured, and a 1-bit HARQ-ACK is determined or generated.

In some embodiments, the second DCI format may include a first Counter-Downlink Assignment Index (C-DAI) and a second C-DAI.

In some implementations, a value of the first C-DAI may indicate an accumulative number of PDSCH receptions in a first PDSCH group, SPS PDSCH release indications, or SCell dormancy indications up to a current serving cell and a current PDCCH monitoring occasion.

In some implementations, a value of the second C-DAI may indicate an accumulative number of PDSCH receptions in a second PDSCH group up to a current serving cell and a current PDCCH monitoring occasion.

In other words, the C-DAIs are counted separately for the first PDSCH group and the second PDSCH group. As an example, the terminal receives the second DCI format transmitted by the network, and the second DCI format is used to schedule PDSCHs on two carriers. The second DCI format includes two C-DAI indication fields, the two C-DAIs corresponding to the first PDSCH group and the second PDSCH group, or corresponding to the first HARQ-ACK information and the second HARQ-ACK information, or corresponding to the first HARQ-ACK subcode codebook and the second HARQ-ACK sub-codebook, respectively.

It should be noted that, the embodiment of the present disclosure is not limited to any specific values of the first parameter and the second parameter. For example, in other alternative embodiments, the second parameter may be 1, or the second parameter may be a value greater than or equal to 2, e.g., 3 or 4.

In some embodiments, the second DCI format may include a first Total-Downlink Assignment Index (T-DAI) and a second T-DAI.

In some implementations, a value of the first T-DAI may indicate an accumulative number of PDSCH receptions in a first PDSCH group, SPS PDSCH release indications or SCell dormancy indications on all serving cells up to a current PDCCH monitoring occasion.

In some implementations, a value of the second T-DAI may indicate an accumulative number of PDSCH receptions in a second PDSCH group on all serving cells up to a current PDCCH monitoring occasion.

In other words, the T-DAIs are counted separately for the first PDSCH group and the second PDSCH group. As an example, the terminal receives the second DCI format transmitted by the network, and the second DCI format is used to schedule PDSCHs on two carriers. The second DCI format includes two T-DAI indication fields, the two T-DAIs corresponding to the first PDSCH group and the second PDSCH group, or corresponding to the first HARQ-ACK information and the second HARQ-ACK information, or corresponding to the first HARQ-ACK sub-codebook and the second HARQ-ACK sub-codebook, respectively.

If the PDSCHs are not grouped, referring to the relevant content shown in FIG. 4, the DAIs corresponding to the two PDSCHs scheduled by one DCI are continuously counted, and the terminal can only achieve the performance of combating missed detection of one DCI. If the C-DAIs and the T-DAIs are counted separately for the first PDSCH group and the second PDSCH group, and the terminal can achieve the capability of combating missed detection of 3 consecutive pieces of DCI.

In some embodiments, the PDSCH reception(s) scheduled by the first DCI format or the second DCI format may include TB-based PDSCH reception(s). For example, the PDSCH reception(s) scheduled by the first DCI format or the second DCI format may include CBG-based PDSCH reception(s) and CBG-based PDSCH reception(s).

In some embodiments, S220 may include: determining or generating a third HARQ-ACK sub-codebook or third HARQ-ACK information, the third HARQ-ACK sub-codebook or the third HARQ-ACK information including HARQ-ACK bits corresponding to TB-based PDSCH receptions in the first PDSCH group; and/or determining or generating a fourth HARQ-ACK sub-codebook or fourth HARQ-ACK information, the fourth HARQ-ACK sub-codebook or the fourth HARQ-ACK information including HARQ-ACK bits corresponding to CBG-based PDSCH receptions in the first PDSCH group; and/or determining or generating a fifth HARQ-ACK sub-codebook or fifth HARQ-ACK information, the fifth HARQ-ACK sub-codebook or the fifth HARQ-ACK information including HARQ-ACK bits corresponding to TB-based PDSCH receptions in the second PDSCH group; and/or determining or generating a sixth HARQ-ACK sub-codebook or sixth HARQ-ACK information, the sixth HARQ-ACK sub-codebook or the sixth HARQ-ACK information including HARQ-ACK bits corresponding to CBG-based PDSCH receptions in the second PDSCH group.

Here, the target HARQ-ACK codebook may include at least one of: the third HARQ-ACK sub-codebook, the fourth HARQ-ACK sub-codebook, the fifth HARQ-ACK sub-codebook, or the sixth HARQ-ACK sub-codebook; or the target HARQ-ACK codebook may include at least one of: the third HARQ-ACK information, the fourth HARQ-ACK information, the fifth HARQ-ACK ACK information, or the sixth HARQ-ACK information.

In some embodiments, S220 may include:

- determining or generating a seventh HARQ-ACK sub-codebook or seventh HARQ-ACK information, the seventh HARQ-ACK sub-codebook or the seventh HARQ-ACK information including a third HARQ-ACK sub-codebook or third HARQ-ACK information, the third HARQ-ACK sub-codebook or the third HARQ-ACK information including HARQ-ACK bits corresponding to TB-based PDSCH receptions in a first PDSCH group; and/or the seventh HARQ-ACK sub-codebook including the fourth HARQ-ACK sub-codebook or fourth HARQ-ACK information, the fourth HARQ-ACK sub-codebook or the fourth HARQ-ACK information including HARQ-ACK bits corresponding to CBG-based PDSCH receptions in the first PDSCH group; and/or
- determining or generating an eighth HARQ-ACK sub-codebook or eighth HARQ-ACK information, the eighth HARQ-ACK sub-codebook or the eighth HARQ-ACK information including a fifth HARQ-ACK sub-codebook or fifth HARQ-ACK information, the fifth HARQ-ACK sub-codebook or the fifth HARQ-ACK information including HARQ-ACK bits corresponding to TB-based PDSCH receptions in the second PDSCH group; and/or the eighth HARQ-ACK sub-codebook including a sixth HARQ-ACK sub-codebook or sixth HARQ-ACK information, the sixth HARQ-ACK sub-codebook or the sixth HARQ-ACK information including HARQ-ACK bits corresponding to CBG-based PDSCH receptions in the second PDSCH group.

Here, the target HARQ-ACK codebook may include at least one of: the seventh HARQ-ACK sub-codebook or the eighth HARQ-ACK sub-codebook; or the target HARQ-ACK codebook may include at least one of: the seventh HARQ-ACK information or the eighth HARQ-ACK information.

In short, the seventh HARQ-ACK sub-codebook or the seventh HARQ-ACK information can be generated for the first PDSCH group. The seventh HARQ-ACK sub-codebook or the seventh HARQ-ACK information includes two HARQ-ACK sub-codebooks, one for TB-based receptions and one for CBG-based receptions. The eighth HARQ-ACK sub-codebook or the eighth HARQ-ACK information can be generated for the second PDSCH group. The eighth HARQ-ACK sub-codebook or the eighth HARQ-ACK information includes two HARQ-ACK sub-codebooks, one for TB-based receptions and one for CBG-based receptions.

In some implementations, S220 may include: determining or generating, for a first serving cell set, the third HARQ-ACK sub-codebook or the third HARQ-ACK information, and/or the fifth HARQ-ACK sub-codebook or the fifth HARQ-ACK information. The first serving cell set includes all downlink serving cells configured by a network device for the terminal.

In some implementations, S220 may include: determining or generating, for a second serving cell set, the fourth HARQ-ACK sub-codebook or the fourth HARQ-ACK information, and/or the sixth HARQ-ACK sub-codebook or the sixth HARQ-ACK information. The second serving cell set includes serving cells configured with CBG transmission parameters. As an example, the serving cells in the second serving cell set are all configured with CBG transmission parameters.

In some implementations, among the third HARQ-ACK sub-codebook, the fourth HARQ-ACK sub-codebook, the fifth HARQ-ACK sub-codebook, and the sixth HARQ-ACK sub-codebook, the HARQ-ACK sub-codebooks included in the target HARQ-ACK codebook may be arranged in any order to form the target HARQ-ACK codebook. Alternatively, among the third HARQ-ACK information, the fourth HARQ-ACK information, the fifth HARQ-ACK information, and the sixth HARQ-ACK information, the HARQ-ACK information included in the target HARQ-ACK codebook may be arranged in any order to form the target HARQ-ACK codebook.

FIG. 6 and FIG. 7 each show an example of an order of sub-codebooks in the target HARQ-ACK codebook according to an embodiment of the present disclosure.

As shown in FIG. 6, the sub-codebooks in the target HARQ-ACK codebook may include the third HARQ-ACK sub-codebook, the fourth HARQ-ACK sub-codebook, the fifth HARQ-ACK sub-codebook, and the sixth HARQ-ACK sub-codebook, sequentially. As shown in FIG. 7, the sub-codebooks in the target HARQ-ACK codebook may include the third HARQ-ACK sub-codebook, the fifth HARQ-ACK sub-codebook, the fourth HARQ-ACK sub-codebook, and the sixth HARQ-ACK sub-codebook, sequentially.

In some implementations, among the third HARQ-ACK sub-codebook, the fourth HARQ-ACK sub-codebook, the fifth HARQ-ACK sub-codebook, and the sixth HARQ-ACK sub-codebook, for each HARQ-ACK sub-codebook included in the target HARQ-ACK codebook, its C-DAI or T-DAI may be counted separately. Alternatively, among the third HARQ-ACK information, the fourth HARQ-ACK information, the fifth HARQ-ACK information, and the sixth HARQ-ACK information, for each HARQ-ACK information included in the target HARQ-ACK codebook, its C-DAI or T-DAI may be counted separately.

In other words, for TB-based PDSCH receptions in the first PDSCH group, its C-DAI or T-DAI may be counted separately. For CBG-based PDSCH receptions in the first PDSCH group, its C-DAI or T-DAI DAI may be counted separately. For TB-based PDSCH receptions in the second PDSCH group, its C-DAI or T-DAI may be counted separately. For CBG-based PDSCH receptions in the second PDSCH group, its C-DAI or T-DAI may be counted separately.

In some embodiments, the second DCI format may be used to schedule at least two PDSCHs, and the at least two PDSCHs correspond to at least two carriers, respectively. In other words, the at least two PDSCHs corresponding to the at least two carriers respectively may correspond to one second DCI format.

In some embodiments, a carrier set configured for the terminal may include a first carrier set to a third carrier set, and any carrier set in the first carrier set to the third carrier set may be an empty set or a non-empty set. The first carrier set and/or the third carrier set corresponds to the first DCI format, and the second carrier set and/or the third carrier set corresponds to the second DCI format.

In an implementation, none of the first carrier set to the third carrier set is configured with a first parameter, and for one or more of the first carrier set to the third carrier set that is not configured with a second parameter and is not configured with CBG-based transmission, the HARQ-ACK information corresponding to the PDSCH scheduled by the first DCI format is 1-bit information, and the HARQ-ACK information corresponding to each PDSCH scheduled by the second DCI format is 1-bit information.

In an implementation, none of the first carrier set to the third carrier set is configured with a first parameter, and for one or more of the first carrier set to the third carrier set that is configured with the second parameter as 2 and is not configured with CBG-based transmission, the HARQ-ACK information corresponding to the PDSCH scheduled by the first DCI format is 2-bit information, and the HARQ-ACK information corresponding to each PDSCH scheduled by the second DCI format is 2-bit information.

In an implementation, none of the first carrier set to the third carrier set is configured with a first parameter, and for one or more of the first carrier set to the third carrier set that is configured with the second parameter as 2 and is configured with CBG-based transmission (for example, the maximum number of CBGs is N), the HARQ-ACK information corresponding to the PDSCH scheduled by the first DCI format is 2*N-bit information, and the HARQ-ACK information corresponding to each PDSCH scheduled by the second DCI format is 2*N-bit information.

The solutions of the present disclosure will be described below in conjunction with the embodiments.

Embodiment 1

In this embodiment, it is assumed that the terminal is configured with three carrier sets, that is, the first carrier set to the third carrier set.

Here, for the first carrier set, the terminal is only configured with the first DCI format; for the second carrier set, the terminal is only configured with the second DCI format; and for the third carrier set, the terminal is configured with the first DCI format and the second DCI format. The first parameter and the second parameter are not configured for the first carrier set to the third carrier set. The first parameter is used to enable HARQ-ACK spatial bundling, and the second parameter is used to indicate a maximum number of code words that is schedulable by one DCI.

Based on this, for PDSCHs scheduled by the first DCI format in the first carrier set and the third carrier set, SPS PDSCH releases, SPS PDSCH receptions, indicated SCell dormancies, and first PDSCHs scheduled by the second DCI format, the terminal generates a first HARQ-ACK sub-codebook. In the first HARQ-ACK sub-codebook, for each DAI (such as C-DAI and/or T-DAI), the terminal generates 1-bit HARQ-ACK information. For second PDSCHs scheduled by the second DCI format in the second carrier set and the third carrier set, the terminal generates a second HARQ-ACK sub-codebook. In the second HARQ-ACK sub-codebook, for each DAI (for example C-DAI and/or T-DAI), the terminal generates 1-bit HARQ-ACK information.

FIG. 8 shows an example of a target HARQ-ACK codebook when neither of the first parameter and the second parameter is configured for the terminal according to an embodiment of the present disclosure.

As shown in FIG. 8, the terminal receives the second DCI format on carrier 1 on PDCCH monitoring occasion 1, and schedules PDSCH 1 and PDSCH 2 transmitted on carrier 1 and carrier 2. The terminal receives the second DCI format on carrier 1 on PDCCH monitoring occasion 2, and schedules PDSCH 3 and PDSCH 4 transmitted on carrier 1 and carrier 2. The terminal receives the first DCI format on carrier 3 on PDCCH monitoring occasion 3, and schedules PDSCH 5 transmitted on carrier 3. The terminal receives the first DCI format on carrier 1 on PDCCH monitoring occasion 4 and schedules PDSCH 6 transmitted on carrier 1, receives the first DCI format on carrier 2 on PDCCH monitoring occasion 4 and schedules PDSCH 7 transmitted on carrier 2, and receives the first DCI format on carrier 3 on PDCCH monitoring occasion 4 and schedules PDSCH 8 transmitted on carrier 3.

Based on the solutions of the present disclosure, the PDSCH scheduled by the first DCI format and the PDSCH with the lower carrier index as scheduled by the second DCI format belong to the first PDSCH group, and the PDSCH with the higher carrier index as scheduled by the second DCI format belongs to the second PDSCH group. The DAIs (i.e., C-DAI and T-DAI) are counted for the first PDSCH group and the second PDSCH group separately. Then the terminal determines that the first HARQ-ACK information corresponding to the first PDSCH group includes 6 bits {b1, b2, b3, b4, b5, b6}, corresponding to PDSCH 1, PDSCH 3, and PDSCH 5-8, respectively. The terminal determines that the second HARQ-ACK information corresponding to the second PDSCH group includes 2 bits {b1, b2}, corresponding to PDSCH 2 and PDSCH 4, respectively. The terminal appends the second HARQ-ACK information to the first HARQ-ACK information, to obtain HARQ-ACK information of 8 bits in total.

Embodiment 2

In this embodiment, it is assumed that the terminal is configured with three carrier sets, that is, the first carrier set to the third carrier set.

For the first carrier set, the terminal is only configured with the first DCI format; for the second carrier set, the terminal is only configured with the second DCI format; and for the third carrier set, the terminal is configured with the first DCI format and the second DCI format. The first parameter and the second parameter are not configured for the first carrier set to the third carrier set, and CBG-based transmission is configured for the first carrier set and the second carrier set (for example, the maximum number of CBGs is 4).

Based on this, for TB-based PDSCH receptions in the first PDSCH group in the first carrier set and the third carrier set, the terminal generates a third HARQ-ACK sub-codebook. In the third HARQ-ACK sub-codebook, for each DAI (such as C-DAI and/or T-DAI), the terminal generates 1-bit HARQ-ACK information. For CBG-based PDSCH receptions in the first PDSCH group in the first carrier set and the third carrier set, the terminal generates a fourth HARQ-ACK sub-codebook. In the fourth HARQ-ACK sub-codebook, for each DAI (such as C-DAI and/or T-DAI), the terminal generates 4-bit HARQ-ACK information. For TB-based PDSCH receptions in the second PDSCH group in the second carrier set and the third carrier set, the terminal generates a fifth HARQ-ACK sub-codebook. In the fifth HARQ-ACK sub-codebook, for each DAI (such as C-DAI and/or T-DAI), the terminal generates 1-bit HARQ-ACK information. For CBG-based PDSCH receptions in the second PDSCH group in the second carrier set and the third carrier set, the terminal generates a sixth HARQ-ACK sub-codebook. In the sixth HARQ-ACK sub-codebook, for each DAI (such as C-DAI and/or T-DAI), the terminal generates 4-bit HARQ-ACK information.

FIG. 9 shows an example of a target HARQ-ACK codebook for CBG-based transmission when the terminal is not configured with the first parameter and the second parameter according to an embodiment of the present disclosure.

As shown in FIG. 9, the terminal receives the second DCI format on carrier 1 on PDCCH monitoring occasion 1, and schedules PDSCH 1 and PDSCH 2 transmitted on carrier 1 and carrier 2. The terminal receives the second DCI format on carrier 1 on PDCCH monitoring occasion 2, and schedules PDSCH 3 and PDSCH 4 transmitted on carrier 1 and carrier 2. The terminal receives the first DCI format on carrier 3 on PDCCH monitoring occasion 3, and schedules PDSCH 5 transmitted on carrier 3. The terminal receives the first DCI format on carrier 1 on PDCCH monitoring occasion 4 and schedules PDSCH 6 transmitted on carrier 1, receives the first DCI format on carrier 2 on PDCCH monitoring occasion 4 and schedule PDSCH 7 transmitted on carrier 2, and receives the first DCI format on carrier 3 on PDCCH monitoring occasion 4 and schedules PDSCH 8 transmitted on carrier 3.

Based on the solution of the present disclosure, the terminal generates 3*1=3-bit HARQ-ACK for PDSCH 5, PDSCH 7, and PDSCH 8 based on TB transmission in the first PDSCH group. The terminal generates 3*4=12-bit HARQ-ACK for PDSCH 1, PDSCH 3, and PDSCH 6 based on CBG transmission in the first PDSCH group. The terminal generates 2*1=2-bit HARQ-ACK for PDSCH 2 and PDSCH 4 based on TB transmission in the second PDSCH group. There is no PDSCH based on CBG transmission in the second PDSCH group. Therefore, the terminal generates 3+12+2=17-bit HARQ-ACK in total. The present disclosure is not limited to any specific order of the HARQ-ACK. For example, the following two schemes are possible.

Scheme 1:

The TB-based HARQ-ACK (3 bits) in the first PDSCH group, the CBG-based HARQ-ACK (12 bits) in the first PDSCH group, the TB-based HARQ-ACK (2 bits) in the second PDSCH group, and the CBG-based HARQ-ACK (0 bits) in the second PDSCH group are ordered.

Scheme 2:

The TB-based HARQ-ACK (3 bits) in the first PDSCH group, the TB-based HARQ-ACK (2 bits) in the second PDSCH group, the CBG-based HARQ-ACK (12 bits) in the first PDSCH group, and the CBG-based HARQ-ACK (0 bits) in the second PDSCH group are ordered.

In this embodiment, the second DCI format includes two T-DAI indication fields, and the two T-DAI may correspond to the first PDSCH group and the second PDSCH group, or correspond to the first HARQ-ACK information and the second HARQ-ACK information as described above, or correspond to the first HARQ-ACK sub-codebook and the second HARQ-ACK sub-codebook as described above, respectively. The advantage of including two T-DAIs is that, if two PDSCH groups share one T-DAI indication field, when the terminal receives the first PDSCH group with C-DAI=3, and the first PDSCH group has C-DAI=2 and T-DAI=7, the terminal knows that two pieces of DCI have been missed, but the terminal cannot know whether the PDSCH scheduled by the missed DCI is the PDSCH in the first PDSCH group or the PDSCH in the second PDSCH group, and thus it cannot know the positions at which the 2-bit NACK is to be filled. That is, the advantage of including two T-DAIs is that the understandings of the bit order in the HARQ-ACK codebook by the terminal and the base station can be consistent.

Embodiment 3

In this embodiment, the second DCI format includes one T-DAI indication field.

FIG. 10 shows an example of the first PDSCH group and the second PDSCH group sharing the T-DAI indication field according to an embodiment of the present disclosure.

As shown in FIG. 10, the terminal receives the second DCI format on carrier 1 on PDCCH monitoring occasion 1, and schedules PDSCH 1 and PDSCH 2 transmitted on carrier 1 and carrier 2. The terminal receives the second DCI format on carrier 1 on PDCCH monitoring occasion 2, and schedules PDSCH 3 and PDSCH 4 transmitted on carrier 1 and carrier 2. The terminal receives the first DCI format on carrier 3 on PDCCH monitoring occasion 3, and schedules PDSCH 5 transmitted on carrier 3. The terminal receives the first DCI format on carrier 1 on PDCCH monitoring occasion 4 and schedules PDSCH 6 transmitted on carrier 1, receives the first DCI format on carrier 2 on PDCCH monitoring occasion 4 and schedules PDSCH 7 transmitted on carrier 2, and receives the first DCI format on carrier 3 on PDCCH monitoring occasion 4, and schedules PDSCH 8 transmitted on carrier 3.

Based on the solution of the present disclosure, if the first PDSCH group and the second PDSCH group share the T-DAI indication field, that is, the T-DAI is counted based on the PDSCHs of the two groups together (as shown in the counting rule of T-DAI in FIG. 10), when the terminal misses detection of two pieces of DCI on carrier 2 and carrier 3 on PDCCH monitoring occasion 4, the terminal can only know that for the first PDSCH group, there are 4 bits of valid HARQ-ACK information, and for the second PDSCH group, there is only 2 bits of valid HARQ-ACK information. However, according to the T-DAI=4 received on PDCCH monitoring occasion 4, it can be known that the terminal needs to generate in total 8 bits of HARQ-ACK information, then for the remaining 8-(4+2)=2 bits of NACK, the terminal does not know whether it should be filled after the HARQ-ACKs of the first PDSCH group or after the HARQ-ACKs of the second PDSCH group, which may cause the terminal to fill the NACK bits at incorrect positions, resulting in different understandings of the positions of the 8-bit HARQ-ACK between the base station and the terminal.

The preferred embodiments of the present disclosure have been described in detail above with reference to the accompanying drawings. However, the present disclosure is not limited to the specific details of the above embodiments. Various simple modifications can be made to the technical solutions of the present disclosure without departing from the scope of the technical concept of the present disclosure. These simple modifications all belong to the protection scope of the present disclosure. For example, the specific technical features described in the above specific embodiments can be combined as appropriate provided that they do not conflict. In order to avoid unnecessary repetition, the description of various possible combinations will be omitted here. In another example, the embodiments of the present disclosure can also be combined as appropriate, as long as they do not violate the concept of the present disclosure, and they should also be regarded as the content disclosed in the present disclosure.

It should also be understood that, in the method embodiments of the present disclosure, the values of the sequence numbers of the above processes do not mean the order of execution, and the execution order of each process should be determined by its functions and internal logics, and the implementation of the present disclosure is not limited to any specific order. In addition, in the embodiments of the present disclosure, the terms "downlink" and "uplink" are used to indicate the transmission direction of signals or data. Here, "downlink" is used to indicate that the transmission direction of signals or data is a first direction from a station to a user equipment of a cell, and "uplink" is used to indicate that the transmission direction of signals or data is a second direction from a user equipment in a cell to a station. For example, a "downlink signal" indicates that the transmission direction of the signal is the first direction. In addition, in this embodiment of the present disclosure, the term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

The wireless communication method according to the embodiment of the present disclosure has been described in detail above from the perspective of the terminal device with reference to FIG. 5 to FIG. 9. The wireless communication method according to the embodiment of the present disclosure will be described below from the perspective of the network device in conjunction with FIG. 11.

FIG. 11 shows a schematic flowchart illustrating a wireless communication method 300 according to an embodiment of the present disclosure. The method 300 can be performed interactively by a terminal device and a network device. The terminal device shown in FIG. 11 may be the terminal device shown in FIG. 1, and the network device shown in FIG. 11 may be the access network device shown in FIG. 1.

As shown in FIG. 11, the method 300 may include:

at S310, transmitting at least one Downlink Control Information (DCI) to a terminal device; and at S320, determining or generating a target Hybrid Automatic Repeat reQuest Acknowledgement (HARQ-ACK) codebook, the target HARQ-ACK codebook corresponding to Physical Downlink Shared Channel (PDSCH) reception scheduled by the at least one DCI, Semi-Persistent Scheduling (SPS) PDSCH release indicated by the at least one DCI or Secondary Cell (SCell) dormancy indicated by the at least one DCI.

The at least one DCI includes a first DCI format and/or a second DCI format, the first DCI format being used to schedule one PDSCH, and the second DCI format being used to schedule at least two PDSCHs corresponding to at least one PDSCH group.

It should be understood that for the steps in the method 300, reference may be made to the corresponding steps in the method 200, and for the sake of brevity, details thereof will be omitted here. For example, for the step S320 in the method 300, reference may be made to the step S220 in the method 200.

The method embodiments of the present disclosure have been described in detail above with reference to FIG. 1 to FIG. 11, and the device embodiments of the present disclosure will be described in detail below in conjunction with FIG. 12 to FIG. 15.

FIG. 12 is a schematic block diagram of a terminal device 400 according to an embodiment of the present disclosure.

As shown in FIG. 12, the terminal device 400 may include:

a receiving unit 410 configured to receive at least one Downlink Control Information (DCI) transmitted by a network device; and a processing unit 420 configured to determine or generate a target Hybrid Automatic Repeat reQuest Acknowledgement (HARQ-ACK) codebook, the target HARQ-ACK codebook corresponding to Physical Downlink Shared Channel (PDSCH) reception scheduled by the at least one DCI, Semi-Persistent Scheduling (SPS) PDSCH release indicated by the at least one DCI or Secondary Cell (SCell) dormancy indicated by the at least one DCI.

The at least one DCI includes a first DCI format and/or a second DCI format, the first DCI format being used to schedule one PDSCH, and the second DCI format being used to schedule at least two PDSCHs corresponding to at least one PDSCH group.

In some embodiments, the processing unit 420 may be configured to: determine or generate first HARQ-ACK information or a first HARQ-ACK sub-codebook, the first HARQ-ACK information or the first HARQ-ACK sub-codebook including HARQ-ACK bits corresponding to PDSCHs in a first PDSCH group; the target HARQ-ACK codebook including the first HARQ-ACK sub-codebook or the first HARQ-ACK information, and the at least one PDSCH group including the first PDSCH group.

In some embodiments, the processing unit 420 may be configured to: determine or generate second HARQ-ACK information or a second HARQ-ACK sub-codebook, the second HARQ-ACK information or the second HARQ-ACK sub-codebook including HARQ-ACK bits corresponding to PDSCHs in a second PDSCH group; the target HARQ-ACK codebook including the second HARQ-ACK sub-codebook or the second HARQ-ACK information, the at least one PDSCH group including the second PDSCH group, and the first PDSCH group being different from the second PDSCH group.

In some embodiments, the processing unit 420 may be configured to:

determine or generate first HARQ-ACK information or a first HARQ-ACK sub-codebook, the first HARQ-ACK information or the first HARQ-ACK sub-codebook including HARQ-ACK bits corresponding to PDSCHs in a first PDSCH group, and the at least one PDSCH group including the first PDSCH group;

determine or generate second HARQ-ACK information or a second HARQ-ACK sub-codebook, the second HARQ-ACK information or the second HARQ-ACK sub-codebook including HARQ-ACK bits corresponding to PDSCHs in a second PDSCH group; the at least one PDSCH group including the second PDSCH group, and the first PDSCH group being different from the second PDSCH group; and append the second HARQ-ACK sub-codebook or second HARQ-ACK information to the first HARQ-ACK sub-codebook or the first HARQ-ACK information to form the HARQ-ACK codebook; or append the first HARQ-ACK sub-codebook or the first HARQ-ACK information to the second HARQ-ACK sub-codebook or the second HARQ-ACK information to form the HARQ-ACK codebook.

In some embodiments, when the second DCI format schedules two PDSCHs, the first PDSCH group may include at least one of: a PDSCH scheduled by the first DCI format or a first PDSCH scheduled by the second DCI format. The first PDSCH is a PDSCH on a serving cell with a smaller serving cell index among the two PDSCHs.

In some embodiments, when the second DCI format schedules more than two PDSCHs, the first PDSCH group may include at least one of: a PDSCH scheduled by the first DCI format or X PDSCHs among the PDSCHs scheduled by the second DCI format. The X PDSCHs are PDSCHs on X serving cells with smaller serving cell indexes among the at least two PDSCHs, where X is a positive integer.

In some embodiments, the first HARQ-ACK information or the first HARQ-ACK sub-codebook may further include a HARQ-ACK bit corresponding to the SPS PDSCH release or the SCell dormancy.

In some embodiments, the processing unit 420 may be configured to:

determine or generate a 2-bit HARQ-ACK for the PDSCHs in the first PDSCH group, the SPS PDSCH release, or the SCell dormancy when a terminal is not configured with a first parameter and is configured with a second parameter as 2; or otherwise determine or generate a 1-bit HARQ-ACK. The first parameter is used to enable HARQ-ACK spatial bundling, and the second parameter is used to indicate a maximum number of code words that is schedulable by one DCI.

In some embodiments, when the second DCI format schedules two PDSCHs, the second PDSCH group may include: a second PDSCH scheduled by the second DCI format. The second PDSCH is a PDSCH on a serving cell with a larger serving cell index among the two PDSCHs.

In some embodiments, when the second DCI format schedules more than two PDSCHs, the second PDSCH group may include: Y PDSCHs among PDSCHs scheduled by the second DCI format. The Y PDSCHs are PDSCHs on Y serving cells with larger serving cell indexes among the at least two PDSCHs, where Y is a positive integer.

In some embodiments, the processing unit 420 may be configured to: determine or generate a 2-bit HARQ-ACK for the PDSCHs in the second PDSCH group when the terminal is not configured with a first parameter and is configured with a second parameter as 2; or otherwise, determine or generate a 1-bit HARQ-ACK. The first parameter is used to enable HARQ-ACK spatial bundling, and the second parameter is used to indicate a maximum number of code words that is schedulable by one DCI.

In some embodiments, the second DCI format may include a first Counter-Downlink Assignment Index (C-DAI) and a second C-DAI.

In some embodiments, a value of the first C-DAI may indicate an accumulative number of PDSCH receptions in a first PDSCH group, SPS PDSCH release indications, or SCell dormancy indications up to a current serving cell and a current PDCCH monitoring occasion.

In some embodiments, a value of the second C-DAI may indicate an accumulative number of PDSCH receptions in a second PDSCH group up to a current serving cell and a current PDCCH monitoring occasion.

In some embodiments, the second DCI format may include a first Total-Downlink Assignment Index (T-DAI) and a second T-DAI.

In some embodiments, a value of the first T-DAI may indicate an accumulative number of PDSCH receptions in a first PDSCH group, SPS PDSCH release indications or SCell dormancy indications on all serving cells up to a current PDCCH monitoring occasion.

In some embodiments, a value of the second T-DAI may indicate an accumulative number of PDSCH receptions in a second PDSCH group on all serving cells up to a current PDCCH monitoring occasion.

It should be understood that the device embodiments and the method embodiments may correspond to each other, and for similar descriptions, reference may be made to the method embodiments. Specifically, the terminal device 400 shown in FIG. 12 may correspond to the corresponding entity in the method 200 of the embodiment of the present disclosure, and the above and other operations and/or functions of the respective units in the terminal device 400 are provided for implementing the corresponding processes of the respective methods in FIG. 5, and for the sake of brevity, details thereof will be omitted here.

FIG. 13 is a schematic block diagram of a network device 500 according to an embodiment of the present disclosure.

As shown in FIG. 13, the network device 500 may include: a transmitting unit 510 configured to transmit at least one Downlink Control Information (DCI) to a terminal device; and a processing unit 520 configured to determine or generate a target Hybrid Automatic Repeat reQuest Acknowledgement (HARQ-ACK) codebook, the target HARQ-ACK codebook corresponding to Physical Downlink Shared Channel (PDSCH) reception scheduled by the at least one DCI, Semi-Persistent Scheduling (SPS) PDSCH release indicated by the at least one DCI or Secondary Cell (SCell) dormancy indicated by the at least one DCI.

The at least one DCI includes a first DCI format and/or a second DCI format, the first DCI format being used to schedule one PDSCH, and the second DCI format being used to schedule at least two PDSCHs corresponding to at least one PDSCH group.

In some embodiments, the processing unit 520 may be configured to: determine or generate first HARQ-ACK information or a first HARQ-ACK sub-codebook, the first HARQ-ACK information or the first HARQ-ACK sub-codebook including HARQ-ACK bits corresponding to PDSCHs in a first PDSCH group; the target HARQ-ACK codebook including the first HARQ-ACK sub-codebook or the first HARQ-ACK information, and the at least one PDSCH group including the first PDSCH group.

In some embodiments, the processing unit 520 may be configured to: determine or generate second HARQ-ACK information or a second HARQ-ACK sub-codebook, the second HARQ-ACK information or the second HARQ-ACK sub-codebook including HARQ-ACK bits corresponding to PDSCHs in a second PDSCH group; the target HARQ-ACK codebook including the second HARQ-ACK sub-codebook or the second HARQ-ACK information, the at least one PDSCH group including the second PDSCH group, and the first PDSCH group being different from the second PDSCH group.

In some embodiments, the processing unit 520 may be configured to: determine or generate first HARQ-ACK information or a first HARQ-ACK sub-codebook, the first HARQ-ACK information or the first HARQ-ACK sub-codebook including HARQ-ACK bits corresponding to PDSCHs in a first PDSCH group, and the at least one PDSCH group including the first PDSCH group; determine or generate second HARQ-ACK information or a second HARQ-ACK sub-codebook, the second HARQ-ACK information or the second HARQ-ACK sub-codebook including HARQ-ACK bits corresponding to PDSCHs in a second PDSCH group; the at least one PDSCH group including the second PDSCH group, and the first PDSCH group being different from the second PDSCH group; and append the second HARQ-ACK sub-codebook or second HARQ-ACK information to the first HARQ-ACK sub-codebook or the first HARQ-ACK information to form the HARQ-ACK codebook; or append the first HARQ-ACK sub-codebook or the first HARQ-ACK information to the second HARQ-ACK sub-codebook or the second HARQ-ACK information to form the HARQ-ACK codebook.

In some embodiments, when the second DCI format schedules two PDSCHs, the first PDSCH group may include at least one of: a PDSCH scheduled by the first DCI format or a first PDSCH scheduled by the second DCI format. The first PDSCH is a PDSCH on a serving cell with a smaller serving cell index among the two PDSCHs.

In some embodiments, when the second DCI format schedules more than two PDSCHs, the first PDSCH group may include at least one of: a PDSCH scheduled by the first DCI format or X PDSCHs among the PDSCHs scheduled by the second DCI format. The X PDSCHs are PDSCHs on X serving cells with smaller serving cell indexes among the at least two PDSCHs, where X is a positive integer.

In some embodiments, the first HARQ-ACK information or the first HARQ-ACK sub-codebook may further include a HARQ-ACK bit corresponding to the SPS PDSCH release or the SCell dormancy.

In some embodiments, the processing unit 520 may be configured to: determine or generate a 2-bit HARQ-ACK for the PDSCHs in the first PDSCH group, the SPS PDSCH release, or the SCell dormancy when a terminal is not configured with a first parameter and is configured with a second parameter as 2; or otherwise determine or generate a 1-bit HARQ-ACK. The first parameter is used to enable HARQ-ACK spatial bundling, and the second parameter is used to indicate a maximum number of code words that is schedulable by one DCI.

In some embodiments, when the second DCI format schedules two PDSCHs, the second PDSCH group may include: a second PDSCH scheduled by the second DCI format. The second PDSCH is a PDSCH on a serving cell with a larger serving cell index among the two PDSCHs.

In some embodiments, when the second DCI format schedules more than two PDSCHs, the second PDSCH group may include: Y PDSCHs among PDSCHs scheduled by the second DCI format. The Y PDSCHs are PDSCHs on Y serving cells with larger serving cell indexes among the at least two PDSCHs, where Y is a positive integer.

In some embodiments, the processing unit 520 may be configured to: determine or generate 2-bit HARQ-ACK for the PDSCHs in the second PDSCH group when the terminal is not configured with a first parameter and is configured with a second parameter as 2; or otherwise, determine or generate a 1-bit HARQ-ACK. The first parameter is used to enable HARQ-ACK spatial bundling, and the second parameter is used to indicate a maximum number of code words that is schedulable by one DCI.

In some embodiments, the second DCI format may include a first Counter-Downlink Assignment Index (C-DAI) and a second C-DAI.

In some embodiments, a value of the first C-DAI may indicate an accumulative number of PDSCH receptions in a first PDSCH group, SPS PDSCH release indications, or SCell dormancy indications up to a current serving cell and a current PDCCH monitoring occasion.

In some embodiments, a value of the second C-DAI may indicate an accumulative number of PDSCH receptions in a second PDSCH group up to a current serving cell and a current PDCCH monitoring occasion.

In some embodiments, the second DCI format may include a first Total-Downlink Assignment Index (T-DAI) and a second T-DAI.

In some embodiments, a value of the first T-DAI may indicate an accumulative number of PDSCH receptions in a first PDSCH group, SPS PDSCH release indications or SCell dormancy indications on all serving cells up to a current PDCCH monitoring occasion.

In some embodiments, a value of the second T-DAI may indicate an accumulative number of PDSCH receptions in a second PDSCH group on all serving cells up to a current PDCCH monitoring occasion.

It should be understood that the device embodiments and the method embodiments may correspond to each other, and for similar descriptions, reference may be made to the method embodiments. Specifically, the network device 500 shown in FIG. 13 may correspond to the corresponding entity in the method 300 of the embodiment of the present disclosure, and the above and other operations and/or functions of the respective units in the network device 500 are provided for implementing the corresponding processes of the respective methods in FIG. 11, and for the sake of brevity, details thereof will be omitted here.

The communication device according to the embodiment of the present disclosure has been described above from the perspective of functional modules with reference to the accompanying drawings. It should be understood that the functional modules can be implemented in the form of hardware, software instructions, or a combination of hardware and software modules. Specifically, the steps of the method embodiments in the embodiments of the present disclosure may be implemented by hardware integrated logic circuits in the processor and/or software instructions, and the steps of the methods disclosed in conjunction with the embodiments of the present disclosure may be directly embodied as implemented by a hardware decoding processor or a combination of hardware and software modules in a decoding processor. Optionally, the software modules may be located in a random access memory, a flash memory, a read-only memory, a programmable read-only memory, an electrically erasable programmable memory, a register, and other storage media known in the art. The storage medium is located in the memory, and the processor reads the information in the memory, and performs the steps in the above method embodiments in combination with its hardware.

For example, the receiving unit 410 and the transmitting unit 510 as described above may be implemented by a transceiver, and the processing unit 420 and the processing unit 520 may be implemented by a processor.

FIG. 14 is a schematic diagram showing a structure of a communication device 600 according to an embodiment of the present disclosure.

As shown in FIG. 14, the communication device 600 includes a processor 610.

Here, the processor 610 can invoke and execute a computer program from a memory to implement the method in the embodiment of the present disclosure.

As shown in FIG. 14, the communication device 600 may further include a memory 620.

Here, the memory 620 may store indication information, and may further store codes, instructions, etc. to be executed by the processor 610. The processor 610 can invoke and execute a computer program from the memory 620 to implement the method in the embodiment of the present disclosure. The memory 620 may be a separate device independent from the processor 610, or may be integrated in the processor 610.

As shown in FIG. 14, the communication device 600 may further include a transceiver 630.

Here, the processor 610 may control the transceiver 630 to communicate with other devices, and in particular, transmit information or data to other devices, or receive information or data transmitted by other devices. The transceiver 630 may include a transmitter and a receiver. The transceiver 630 may further include one or more antennas.

It can be appreciated that the components in the communication device 600 may be connected via a bus system. Here, the bus system may include a power bus, a control bus and a status signal bus, in addition to a data bus.

It can be appreciated that the communication device 600 may be the terminal device according to the embodiment of the present disclosure, and the communication device 600 may implement the corresponding processes implemented by the terminal device in any of the methods according to the embodiments of the present disclosure. That is, the communication device 600 in the embodiment of the present disclosure may correspond to the terminal device 400 in the embodiment of the present disclosure, and may correspond to the corresponding entity that performs the method 200 according to the embodiment of the present disclosure. For the sake of brevity, details thereof will be omitted here. Similarly, the communication device 600 may be the network device according to the embodiment of the present disclosure, and the communication device 600 may implement the corresponding processes implemented by the network device in any of the methods according to the embodiments of the present disclosure. That is, the communication device 600 in the embodiment of the present disclosure may correspond to the network device 500 in the embodiment of the present disclosure, and may correspond to the corresponding entity that performs the method 300 according to the embodiment of the present disclosure. For the sake of brevity, details thereof will be omitted here.

In addition, an embodiment of the present disclosure also provides a chip.

For example, the chip may be an integrated circuit chip, which has a signal processing capability, and can implement or perform any of the methods, steps, and logic block diagrams disclosed in the embodiments of the present disclosure. The chip may also be referred to as a system level chip, a system chip, a chip system, a system-on-a-chip, or the like. Optionally, the chip can be applied in various communication devices, such that the communication device installed with the chip can perform the methods, steps and logic block diagrams disclosed in the embodiments of the present disclosure.

FIG. 15 is a schematic diagram showing a structure of a chip 700 according to an embodiment of the present disclosure.

As shown in FIG. 15, the chip 700 includes a processor 710.

Here, the processor 710 can invoke and execute a computer program from a memory to implement the method in the embodiment of the present disclosure.

As shown in FIG. 15, the chip 700 may further include a memory 720.

Here, the processor 710 can invoke and execute a computer program from the memory 720 to implement the method in the embodiment of the present disclosure. The memory 720 may store indication information, and may further store codes, instructions, etc. to be executed by the processor 710. The memory 720 may be a separate device independent from the processor 710, or may be integrated in the processor 710.

As shown in FIG. 15, the chip 700 may further include an input interface 730.

Here, the processor 710 can control the input interface 730 to communicate with other devices or chips, and in particular, obtain information or data transmitted by other devices or chips.

As shown in FIG. 15, the chip 700 may further include an output interface 740.

Here, the processor 710 can control the output interface 740 to communicate with other devices or chips, and in particular, output information or data to other devices or chips.

It can be appreciated that the chip 700 may be applied in the network device according to the embodiment of the present disclosure, and the chip 700 may implement the corresponding processes implemented by the network device in any of the methods according to the embodiments of the present disclosure, or the corresponding processes implemented by the terminal device in any of the methods according to the embodiments of the present disclosure. For the sake of brevity, details thereof will be omitted here.

It can be appreciated that the components in the chip 700 may be connected via a bus system. Here, the bus system may include a power bus, a control bus and a status signal bus, in addition to a data bus.

The above processor may include, but not limited to, a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component.

The methods, steps, and logical block diagrams disclosed in the embodiments of the present disclosure can be implemented or performed by the processor. The general purpose processor may be a microprocessor or any conventional processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, erasable programmable memory, or register. The storage medium can be located in the memory, and the processor can read information from the memory and perform the steps of the above methods in combination with its hardware.

The above memory may include, but not limited to, a volatile memory and/or a non-volatile memory. Here, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. As illustrative, rather than limiting, examples, many forms of RAMs are available, including Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), and Direct Rambus RAM (DR RAM).

It is to be noted that the memory used for the system and method described in the present disclosure is intended to include these and any other suitable types of memories.

An embodiment of the present disclosure also provides a computer readable storage medium for storing a computer program. The computer readable storage medium stores one or more programs including instructions which, when executed by a portable electronic device including a plurality of application programs, cause the portable electronic device to perform the method 200 or 300 according to the method embodiments. Optionally, the computer readable storage medium can be applied in the network device in the embodiment of the present disclosure, and the computer program can cause a computer to perform corresponding processes implemented by the network device in the method according to any of the embodiments of the present disclosure. Details thereof will be omitted here for simplicity. Optionally, the computer readable storage medium can be applied in the mobile terminal/terminal device in the embodiment of the present disclosure, and the computer program can cause a computer to perform corresponding processes implemented by the mobile terminal/terminal device in the method according to any of the embodiments of the present disclosure. Details thereof will be omitted here for simplicity.

An embodiment of the present disclosure also provides a computer program product including a computer program. Optionally, the computer program product can be applied in the network device in the embodiment of the present disclosure, and the computer program can cause a computer to perform corresponding processes implemented by the network device in the method according to any of the embodiments of the present disclosure. Details thereof will be omitted here for simplicity. Optionally, the computer program product can be applied in the mobile terminal/terminal device in the embodiment of the present disclosure, and the computer program can cause a computer to perform corresponding processes implemented by the mobile terminal/terminal device in the method according to any of the embodiments of the present disclosure. Details thereof will be omitted here for simplicity.

An embodiment of the present disclosure also provides a computer program which, when executed by a computer, causes the computer to perform the method 200 or 300 according to the method embodiments. Optionally, the computer program can be applied in the network device in the embodiment of the present disclosure. The computer program, when executed on a computer, can cause the computer to perform corresponding processes implemented by the network device in the method according to any of the embodiments of the present disclosure. Details thereof will be omitted here for simplicity. Optionally, the computer program can be applied in the mobile terminal/terminal device in the embodiment of the present disclosure. The computer program, when executed on a computer, can cause the computer to perform corresponding processes implemented by the mobile terminal/terminal device in the method according to any of the embodiments of the present disclosure. Details thereof will be omitted here for simplicity.

An embodiment of the present disclosure further provides a communication system, which may include the above terminal device and network device to form the communication system 100 as shown in FIG. 1. Details thereof will be omitted here for simplicity. It should be noted that the term "system" and the like as used herein may also be referred to as "network management architecture" or "network system" or the like.

It should also be understood that the terms used in the embodiments of the present disclosure and the claims as attached are only for the purpose of describing specific embodiments, and are not intended to limit the embodiments of the present disclosure. For example, as used in the embodiments of the present disclosure and the claims as attached, the singular forms "a," "the," "above," and "said" are intended to include the plural forms as well, unless the context clearly indicates otherwise.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of the embodiments of the present disclosure. When the function is implemented in the form of a software functional unit and sold or used as a standalone product, it can be stored in a computer readable storage medium. Based on this understanding, all or part of the technical solutions according to the embodiments of the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in the embodiments of the present disclosure. The storage medium may include a Universal Serial Bus flash drive, a mobile hard disk, a Read-Only Memory (ROM), a Random Access Memory (RAM), a magnetic disk, an optical disc, or any other medium capable of storing program codes.

Those skilled in the art can clearly understand that, for the convenience and conciseness of the description, for the specific operation processes of the systems, devices, and units described above, reference can be made to the corresponding processes in the foregoing method embodiments, and details thereof will be omitted here. In the embodiments of the present disclosure, it can be appreciated that the disclosed systems, devices, and methods may be implemented in other ways. For example, the divisions of the units or modules or components in the device embodiments as described above are only divisions based on logical functions, and there may be other divisions in actual implementations. For example, more than one unit or module or component may be combined or integrated into another system, or some units or modules or components can be ignored or omitted. In another example, the units/modules/components described above as separate/explicit components may or may not be physically separated, that is, they may be co-located or distributed across a number of network elements. Some or all of the units/modules/components may be selected according to actual needs to achieve the objects of the embodiments of the present disclosure. Finally, it is to be noted that the mutual coupling or direct coupling or communicative connection as shown or discussed above may be indirect coupling or communicative connection between devices or units via some interfaces which may be electrical, mechanical, or in any other forms.

While the specific embodiments of the present disclosure have been described above, the scope of the embodiments of the present disclosure is not limited to these embodiments. Various variants and alternatives can be made by those skilled in the art without departing from the scope of the embodiments of the present disclosure. These variants and alternatives are to be encompassed by the scope of the embodiments of present disclosure as defined by the claims as attached.

What is claimed is:

1. A wireless communication method, comprising:

receiving at least one Downlink Control Information (DCI) transmitted by a network device; and determining or generating a target Hybrid Automatic Repeat reQuest Acknowledgement (HARQ-ACK) codebook, the target HARQ-ACK codebook corresponding to Physical Downlink Shared Channel (PDSCH) reception scheduled by the at least one DCI, Semi-Persistent Scheduling (SPS) PDSCH release indicated by the at least one DCI or Secondary Cell (SCell) dormancy indicated by the at least one DCI, wherein the at least one DCI comprises a first DCI format and/or a second DCI format, the first DCI format being used to schedule one PDSCH, and/or the second DCI format being used to schedule at least two PDSCHs corresponding to at least one PDSCH group;

wherein said determining or generating the target HARQ-ACK codebook comprises:

determining or generating first HARQ-ACK information or a first HARQ-ACK sub-codebook, the first HARQ-ACK information or the first HARQ-ACK sub-codebook comprising HARQ-ACK bits corresponding to PDSCHs in a first PDSCH group; the target HARQ-ACK codebook comprising the first HARQ-ACK sub-codebook or the first HARQ-ACK information, and the at least one PDSCH group comprising the first PDSCH group;

wherein said determining or generating the first HARQ-ACK information or the first HARQ-ACK sub-codebook comprises:

determining or generating a 2-bit HARQ-ACK for the PDSCHs in the first PDSCH group, the SPS PDSCH release, or the SCell dormancy when a terminal is not configured with a first parameter and is configured with a second parameter as 2; or determining or generating a 1-bit HARQ-ACK for the PDSCHs in the first PDSCH group, the SPS PDSCH release, or the SCell dormancy when the terminal is not configured with the first parameter and the second parameter, wherein the first parameter is used to enable HARQ-ACK spatial bundling, and the second parameter is used to indicate a maximum number of code words that is schedulable by one DCI.

2. The method according to claim 1, wherein said determining or generating the target HARQ-ACK codebook comprises:

determining or generating second HARQ-ACK information or a second HARQ-ACK sub-codebook, the second HARQ-ACK information or the second HARQ-ACK sub-codebook comprising HARQ-ACK bits corresponding to PDSCHs in a second PDSCH group; the target HARQ-ACK codebook comprising the second HARQ-ACK sub-codebook or the second HARQ-ACK information, the at least one PDSCH group comprising the second PDSCH group, and the first PDSCH group being different from the second PDSCH group.

3. The method according to claim 2, wherein when the second DCI format schedules two PDSCHs, the second PDSCH group comprises: a second PDSCH scheduled by the second DCI format, wherein the second PDSCH is a PDSCH on a serving cell with a larger serving cell index among the two PDSCHs; or wherein when the second DCI format schedules more than two PDSCHs, the second PDSCH group comprises: Y PDSCHs among PDSCHs scheduled by the second DCI format, wherein the Y PDSCHs are PDSCHs on Y serving cells with larger serving cell indexes among the at least two PDSCHs, wherein Y is a positive integer.

4. The method according to claim 1, wherein the first HARQ-ACK information or the first HARQ-ACK sub-codebook further comprises a HARQ-ACK bit corresponding to the SPS PDSCH release or the SCell dormancy.

5. The method according to claim 1, wherein when the second DCI format schedules two PDSCHs, the first PDSCH group comprises at least one of: a PDSCH scheduled by the first DCI format or a first PDSCH scheduled by the second DCI format, wherein the first PDSCH is a PDSCH on a serving cell with a smaller serving cell index among the two PDSCHs; or wherein when the second DCI format schedules more than two PDSCHs, the first PDSCH group comprises at least one of: a PDSCH scheduled by the first DCI format or X PDSCHs among the PDSCHs scheduled by the second DCI format, wherein the X PDSCHs are PDSCHs on X serving cells with smaller serving cell indexes among the at least two PDSCHs, wherein X is a positive integer.

6. A terminal device, comprising a processor and a memory, wherein the memory has a computer program stored thereon, and the processor is configured to invoke and execute the computer program stored in the memory to:

receive at least one Downlink Control Information (DCI) transmitted by a network device; and determine or generate a target Hybrid Automatic Repeat reQuest Acknowledgement (HARQ-ACK) codebook, the target HARQ-ACK codebook corresponding to Physical Downlink Shared Channel (PDSCH) reception scheduled by the at least one DCI, Semi-Persistent Scheduling (SPS) PDSCH release indicated by the at least one DCI or Secondary Cell (SCell) dormancy indicated by the at least one DCI, wherein the at least one DCI comprises a first DCI format and/or a second DCI format, the first DCI format being used to schedule one PDSCH, and/or the second DCI format being used to schedule at least two PDSCHs corresponding to at least one PDSCH group;

wherein to determine or generate the target HARQ-ACK codebook, the processor is configured to invoke and execute the computer program stored in the memory to:

determine or generate first HARQ-ACK information or a first HARQ-ACK sub-codebook, the first HARQ-ACK information or the first HARQ-ACK sub-codebook comprising HARQ-ACK bits corresponding to PDSCHs in a first PDSCH group; the target HARQ-ACK codebook comprising the first HARQ-ACK sub-codebook or the first HARQ-ACK information, and the at least one PDSCH group comprising the first PDSCH group;

wherein to determine or generate the first HARQ-ACK information or the first HARQ-ACK sub-codebook, the processor is configured to invoke and execute the computer program stored in the memory to:

determine or generate a 2-bit HARQ-ACK for the PDSCHs in the first PDSCH group, the SPS PDSCH release, or the SCell dormancy when a terminal is not configured with a first parameter and is configured with a second parameter as 2; or determine or generate a 1-bit HARQ-ACK for the PDSCHs in the first PDSCH group, the SPS PDSCH release, or the SCell dormancy when the terminal is not configured with the first parameter and the second parameter, wherein the first parameter is used to enable HARQ-ACK spatial bundling, and the second parameter is used to indicate a maximum number of code words that is schedulable by one DCI.

7. The terminal device according to claim 6, wherein said determining or generating the target HARQ-ACK codebook comprises:

determining or generating second HARQ-ACK information or a second HARQ-ACK sub-codebook, the second HARQ-ACK information or the second HARQ-ACK sub-codebook comprising HARQ-ACK bits corresponding to PDSCHs in a second PDSCH group; the target HARQ-ACK codebook comprising the second HARQ-ACK sub-codebook or the second HARQ-ACK information, the at least one PDSCH group comprising the second PDSCH group, and the first PDSCH group being different from the second PDSCH group.

8. The terminal device according to claim 7, wherein when the second DCI format schedules two PDSCHs, the second PDSCH group comprises: a second PDSCH scheduled by the second DCI format, wherein the second PDSCH is a PDSCH on a serving cell with a larger serving cell index among the two PDSCHs; or wherein when the second DCI format schedules more than two PDSCHs, the second PDSCH group comprises: Y PDSCHs among PDSCHs scheduled by the second DCI format, wherein the Y PDSCHs are PDSCHs on Y serving cells with larger serving cell indexes among the at least two PDSCHs, wherein Y is a positive integer.

9. The terminal device according to claim 6, wherein the first HARQ-ACK information or the first HARQ-ACK sub-codebook further comprises a HARQ-ACK bit corresponding to the SPS PDSCH release or the SCell dormancy.

10. The terminal device according to claim 6, wherein when the second DCI format schedules two PDSCHs, the first PDSCH group comprises at least one of: a PDSCH scheduled by the first DCI format or a first PDSCH scheduled by the second DCI format, wherein the first PDSCH is a PDSCH on a serving cell with a smaller serving cell index among the two PDSCHs; or wherein when the second DCI format schedules more than two PDSCHs, the first PDSCH group comprises at least one of: a PDSCH scheduled by the first DCI format or X PDSCHs among the PDSCHs scheduled by the second DCI format, wherein the X PDSCHs are PDSCHs on X serving cells with smaller serving cell indexes among the at least two PDSCHs, wherein X is a positive integer.

11. A network device, comprising a processor and a memory, wherein the memory has a computer program stored thereon, and the processor is configured to invoke and execute the computer program stored in the memory to:

transmit at least one Downlink Control Information (DCI) to a terminal device; and determine or generate a target Hybrid Automatic Repeat reQuest Acknowledgement (HARQ-ACK) codebook, the target HARQ-ACK codebook corresponding to Physical Downlink Shared Channel (PDSCH) reception scheduled by the at least one DCI, Semi-Persistent Scheduling (SPS) PDSCH release indicated by the at least one DCI or Secondary Cell (SCell) dormancy indicated by the at least one DCI, wherein the at least one DCI comprises a first DCI format and/or a second DCI format, the first DCI format being used to schedule one PDSCH, and/or the second DCI format being used to schedule at least two PDSCHs corresponding to at least one PDSCH group;

wherein to determine or generate the target HARQ-ACK codebook, the processor is configured to invoke and execute the computer program stored in the memory to:

determine or generate first HARQ-ACK information or a first HARQ-ACK sub-codebook, the first HARQ-ACK information or the first HARQ-ACK sub-codebook comprising HARQ-ACK bits corresponding to PDSCHs in a first PDSCH group; the target HARQ-ACK codebook comprising the first HARQ-ACK sub-codebook or the first HARQ-ACK information, and the at least one PDSCH group comprising the first PDSCH group;

wherein to determine or generate the first HARQ-ACK information or the first HARQ-ACK sub-codebook, the processor is configured to invoke and execute the computer program stored in the memory to:

determine or generate a 2-bit HARQ-ACK for the PDSCHs in the first PDSCH group, the SPS PDSCH release, or the SCell dormancy when a terminal is not configured with a first parameter and is configured with a second parameter as 2; or determine or generate a 1-bit HARQ-ACK for the PDSCHs in the first PDSCH group, the SPS PDSCH release, or the SCell dormancy when the terminal is not configured with the first parameter and the second parameter, wherein the first parameter is used to enable HARQ-ACK spatial bundling, and the second parameter is used to indicate a maximum number of code words that is schedulable by one DCI.

12. The network device according to claim 11, wherein said determining or generating the target HARQ-ACK codebook comprises:

determining or generating second HARQ-ACK information or a second HARQ-ACK sub-codebook, the second HARQ-ACK information or the second HARQ-ACK sub-codebook comprising HARQ-ACK bits corresponding to PDSCHs in a second PDSCH group; the target HARQ-ACK codebook comprising the second HARQ-ACK sub-codebook or the second HARQ-ACK information, the at least one PDSCH group comprising the second PDSCH group, and the first PDSCH group being different from the second PDSCH group.

13. The network device according to claim 12, wherein when the second DCI format schedules two PDSCHs, the second PDSCH group comprises: a second PDSCH scheduled by the second DCI format, wherein the second PDSCH is a PDSCH on a serving cell with a larger serving cell index among the two PDSCHs; or wherein when the second DCI format schedules more than two PDSCHs, the second PDSCH group comprises: Y PDSCHs among PDSCHs scheduled by the second DCI format, wherein the Y PDSCHs are PDSCHs on Y serving cells with larger serving cell indexes among the at least two PDSCHs, wherein Y is a positive integer.

14. The network device according to claim 11, wherein the first HARQ-ACK information or the first HARQ-ACK sub-codebook further comprises a HARQ-ACK bit corresponding to the SPS PDSCH release or the SCell dormancy.

15. The network device according to claim 11, wherein when the second DCI format schedules two PDSCHs, the first PDSCH group comprises at least one of: a PDSCH scheduled by the first DCI format or a first PDSCH scheduled by the second DCI format, wherein the first PDSCH is a PDSCH on a serving cell with a smaller serving cell index among the two PDSCHs; or wherein when the second DCI format schedules more than two PDSCHs, the first PDSCH group comprises at least one of: a PDSCH scheduled by the first DCI format or X PDSCHs among the PDSCHs scheduled by the second DCI format, wherein the X PDSCHs are PDSCHs on X serving cells with smaller serving cell indexes among the at least two PDSCHs, wherein X is a positive integer.

* * * * *